United States Patent
Lin et al.

(10) Patent No.: US 12,382,454 B2
(45) Date of Patent: Aug. 5, 2025

(54) ADAPTATION OF PARAMETERS FOR CONFIGURED TRANSMISSIONS OR RECEPTIONS

(71) Applicant: Samsung Electronics Co., Ltd., Suwon-si (KR)

(72) Inventors: Qiongjie Lin, Sunnyvale, CA (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 516 days.

(21) Appl. No.: 17/808,976

(22) Filed: Jun. 24, 2022

(65) Prior Publication Data

US 2023/0027895 A1    Jan. 26, 2023

Related U.S. Application Data

(60) Provisional application No. 63/221,224, filed on Jul. 13, 2021, provisional application No. 63/221,753, filed on Jul. 14, 2021.

(51) Int. Cl.
*H04W 72/50* (2023.01)
*H04W 72/11* (2023.01)
*H04W 72/20* (2023.01)

(52) U.S. Cl.
CPC .................. *H04W 72/20* (2023.01)

(58) Field of Classification Search
CPC ... H04W 72/20; H04W 72/11; H04W 72/232; H04W 72/115
See application file for complete search history.

(56) References Cited

U.S. PATENT DOCUMENTS

2017/0223687 A1*  8/2017  Kuchibhotla ......... H04L 5/0007
2019/0082454 A1   3/2019  Shi et al.
(Continued)

FOREIGN PATENT DOCUMENTS

WO   2019028276 A1   2/2019
WO   2020032695 A1   2/2020
(Continued)

OTHER PUBLICATIONS

3GPP TSG RAN WG1 Meeting#90, R1-1713058 Title:Suppoort of Long PUCcH transmission over multiple slots (Year: 2017).*
(Continued)

*Primary Examiner* — Faruk Hamza
*Assistant Examiner* — Abusayeed M Haque

(57) ABSTRACT

Methods and apparatuses for adaptation of parameters for configured transmissions or receptions. A method for receiving semi-persistently scheduled (SPS) physical downlink shared channels (PDSCHs) or for transmitting configured grant (CG) physical uplink shared channels (PUSCHs) includes receiving a physical downlink control channel (PDCCH) that provides a downlink control information (DCI) format; determining, based on values of first fields in the DCI format, activation of SPS PDSCH receptions or of CG PUSCH transmissions; determining, based on values of second fields in the DCI format, a time duration for the SPS PDSCH receptions or for the CG PUSCH transmissions; and receiving the SPS PDSCHs or transmitting the CG PUSCHs within the time duration.

17 Claims, 15 Drawing Sheets

(56) References Cited

U.S. PATENT DOCUMENTS

| | | | |
|---|---|---|---|
| 2019/0238257 A1* | 8/2019 | Hosseini | H04L 1/0016 |
| 2020/0045706 A1 | 2/2020 | Shin et al. | |
| 2020/0092908 A1 | 3/2020 | Li et al. | |
| 2021/0045105 A1* | 2/2021 | Yoon | H04W 72/21 |
| 2021/0105761 A1* | 4/2021 | Cheng | H04L 5/0053 |
| 2021/0314033 A1* | 10/2021 | Fakoorian | H04W 72/535 |
| 2024/0155649 A1* | 5/2024 | Bai | H04W 72/0446 |

FOREIGN PATENT DOCUMENTS

| | | | | |
|---|---|---|---|---|
| WO | 2020204491 A1 | 10/2020 | | |
| WO | WO-2021033119 A1 * | 2/2021 | | H04L 5/0094 |

OTHER PUBLICATIONS

3GPP TSG-RAN WG1#54bis, R1-083603 Title:Remaining Issues with RI multiplexing on PUCCH (Year: 2008).*

"3rd Generation Partnership Project; Technical Specification Group Radio Access Network; NR; Physical channels and modulation (Release 16)", 3GPP TS 38.211 V16.6.0, Jun. 2021, 134 pages.

"3rd Generation Partnership Project; Technical Specification Group Radio Access Network; NR; Multiplexing and channel coding (Release 16)", 3GPP TS 38.212 V16.6.0, Jun. 2021, 153 pages.

"3rd Generation Partnership Project; Technical Specification Group Radio Access Network; NR; Physical layer procedures for control (Release 16)", 3GPP TS 38.213 V16.6.0, Jun. 2021, 187 pages.

"3rd Generation Partnership Project; Technical Specification Group Radio Access Network; NR; Physical layer procedures for data (Release 16)", 3GPP TS 38.214 V16.6.0, Jun. 2021, 172 pages.

"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.

"3rd Generation Partnership Project; Technical Specification Group Radio Access Network; NR; Medium Access Control (MAC) protocol specification (Release 16)", 3GPP TS 38.321 V16.5.0, Jun. 2021, 157 pages.

Intenrational Search Report and Writen Opinion issued Oct. 25, 2022 regarding International application No. PCT/KR2022/010215, 7 pages.

Extended European Search Report issued Sep. 11, 2024 regarding Application No. 22842459.4, 10 pages.

ZTE, "Other enhancements for Rel-16 URLLC", 3GPP TSG RAN WG1 #98, R1-1908241, Aug. 2019, 13 pages.

* cited by examiner

ADAPTATION OF PARAMETERS FOR CONFIGURED TRANSMISSIONS OR RECEPTIONS

CROSS-REFERENCE TO RELATED APPLICATION AND CLAIM OF PRIORITY

This application claims priority under 35 U.S.C. § 119(e) to U.S. Provisional Patent Application No. 63/221,224 filed on Jul. 13, 2021 and U.S. Provisional Patent Application No. 63/221,753 filed on Jul. 14, 2021. The above-identified provisional patent applications are hereby incorporated by reference in their entirety.

TECHNICAL FIELD

The present disclosure relates generally to wireless communication systems and, more specifically, the present disclosure relates to periodicity determination of semi-persistently scheduled (SPS) physical downlink shared channels (PDSCH) receptions or configured grant (CG) physical uplink shared channel (PUSCH) transmissions and to adaptation on DL SPS PDSCH receptions and CG PUSCH transmissions.

BACKGROUND

5th generation (5G) or new radio (NR) mobile communications is gathering increased momentum with all the worldwide technical activities on the various candidate technologies. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to periodicity determination of DL SPS PDSCH receptions and CG PUSCH transmissions and to adaptation on DL SPS PDSCH receptions and CG PUSCH transmissions.

In one embodiment, a method for receiving SPS PDSCHs or for transmitting CG PUSCHs is provided. The method includes receiving a physical downlink control channel (PDCCH) that provides a downlink control information (DCI) format; determining, based on values of first fields in the DCI format, activation of SPS PDSCH receptions or of CG PUSCH transmissions; determining, based on values of second fields in the DCI format, a time duration for the SPS PDSCH receptions or for the CG PUSCH transmissions; and receiving the SPS PDSCHs or transmitting the CG PUSCHs within the time duration.

In another embodiment, a user equipment (UE) is provided. The UE includes a transceiver configured to receive a PDCCH that provides a DCI format and a processor operably coupled to the transceiver. The processor is configured to determine, based on values of first fields in the DCI format, activation of receptions of SPS PDSCHs or transmissions of CG PUSCHs, and determine, based on values of second fields in the DCI format, a time duration for the SPS PDSCH receptions or for the CG PUSCHs transmissions. The transceiver is further configured to receive the SPS PDSCHs or transmit the CG PUSCHs within the time duration.

In yet another embodiment, a base station (BS) is provided. The BS includes a processor configured to determine, based on values of first fields in a DCI format, activation of receptions of SPS PDSCH or transmissions of CG PUSCH transmissions and determine, based on values of second fields in the DCI format, a time duration for the SPS PDSCH receptions or for the CG PUSCHs transmissions. The BS further includes a transceiver operably coupled to the processor. The transceiver is configured to transmit a PDCCH that provides the DCI format and transmit the SPS PDSCHs or receive the CG PUSCHs within the time duration.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
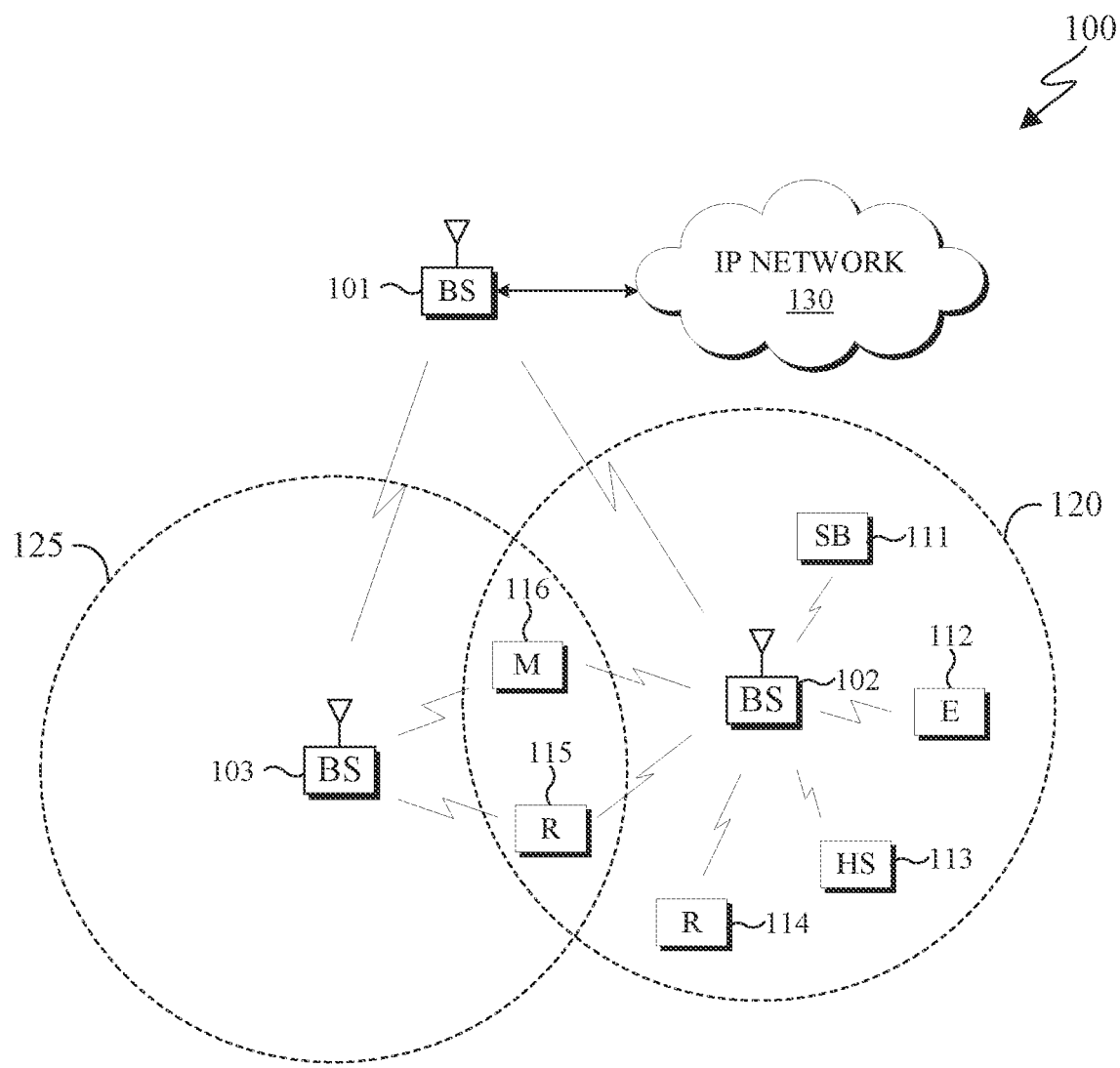
FIG. 1 illustrates an example wireless network according to embodiments of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.6.0, "NR; Physical channels and modulation" ("REF1"); 3GPP TS 38.212 v16.6.0, "NR; Multiplexing and channel coding" ("REF2"); 3GPP TS 38.213 v16.6.0, "NR; Physical layer procedures for control" ("REF3"); 3GPP TS 38.214 v16.6.0, "NR; Physical layer procedures for data" ("REF4"); 3GPP TS 38.331 v16.5.0, "NR; Radio Resource Control (RRC) protocol specification" ("REF5"); and 3GPP TS 38.321 v16.5.0, "NR; Medium Access Control (MAC). protocol specification" ("REF6").

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long-term evolution (LTE) system."

The 5G communication system is considered to be implemented in higher frequency (mmWave) bands, e.g., 28 GHz or 60 GHz bands, so as to accomplish higher data rates or in lower frequency bands, such as below 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
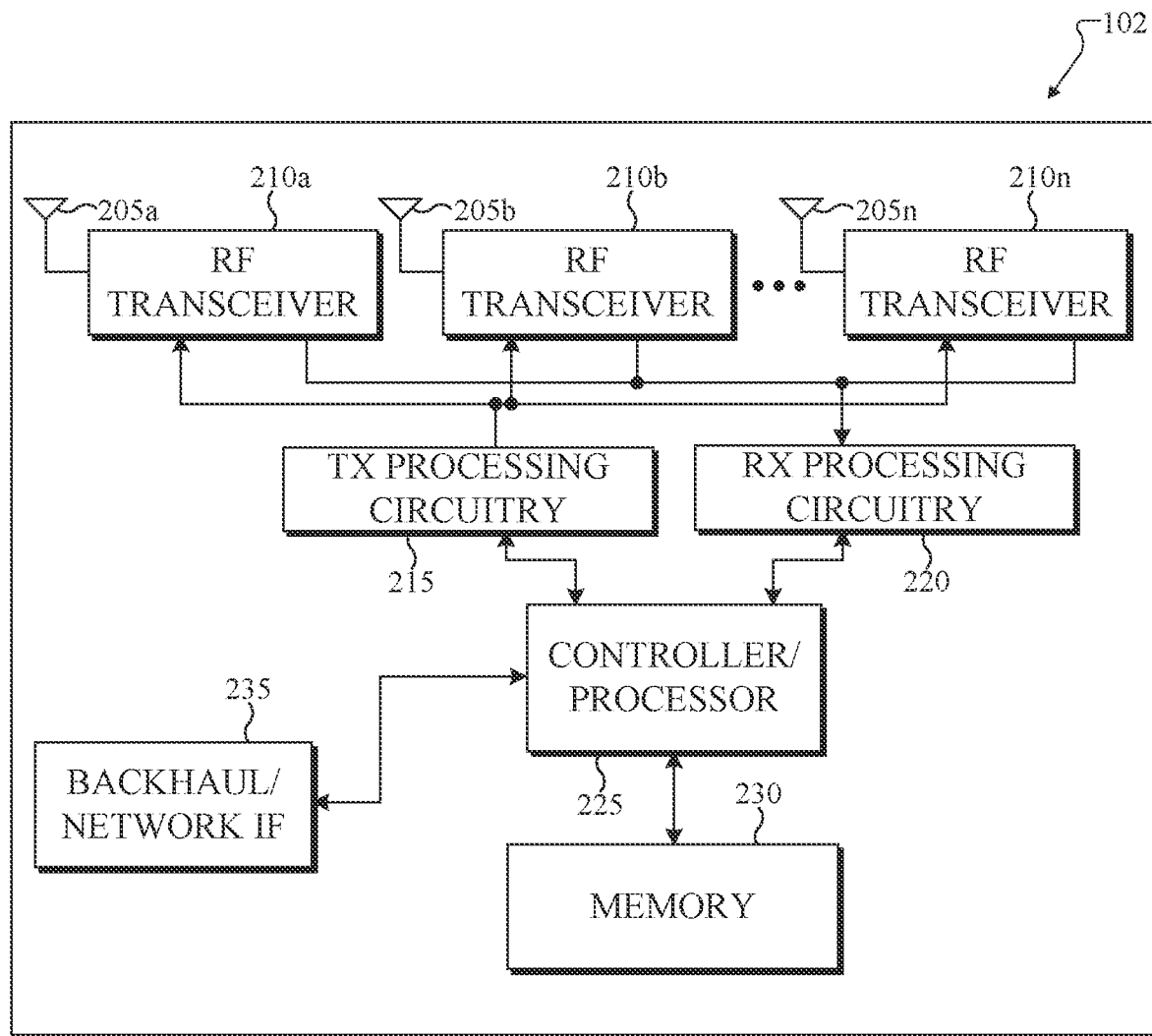
FIG. 2 illustrates an example BS according to embodiments of the present disclosure.
Figure 3:
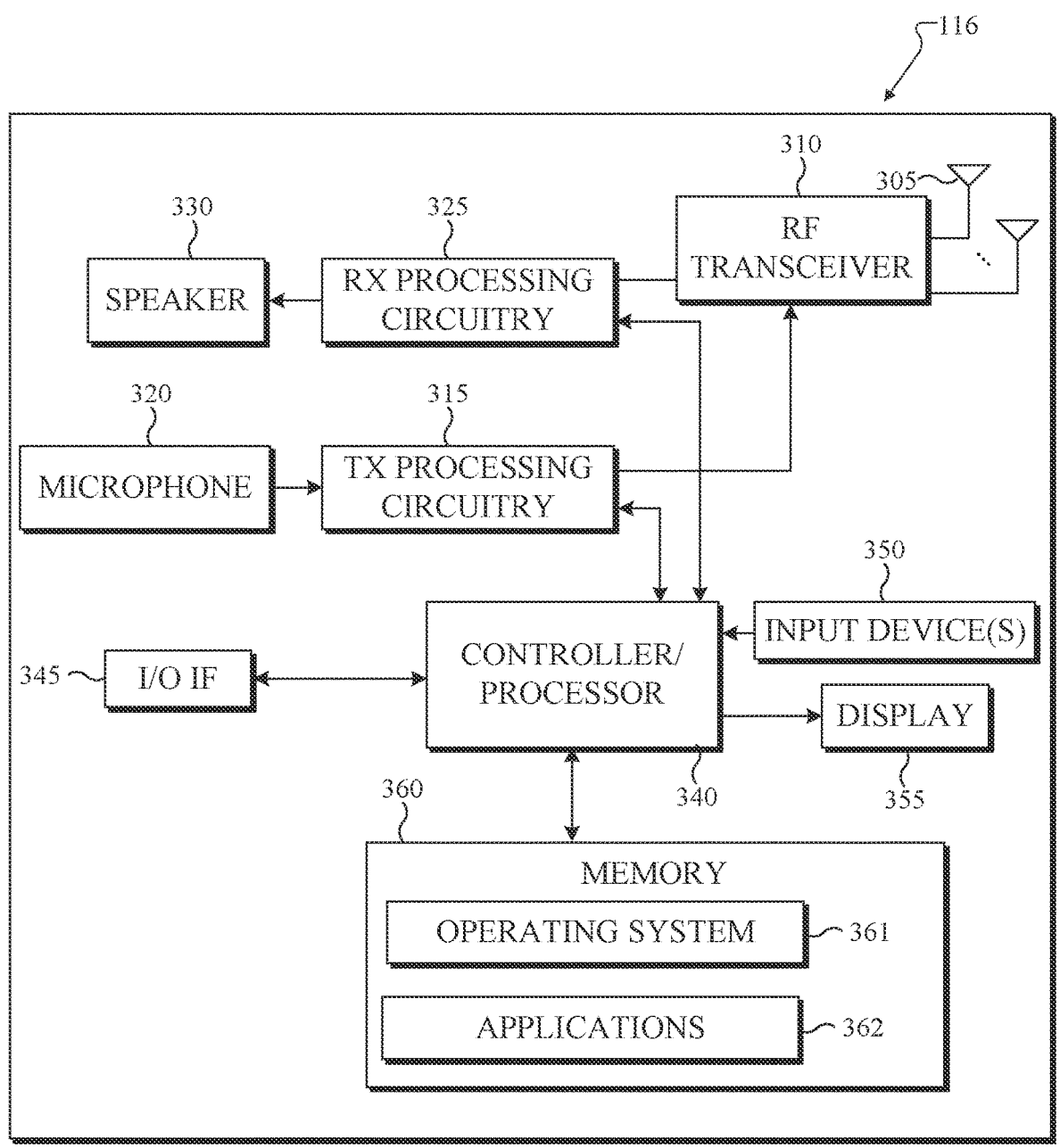
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for periodicity determination of DL SPS PDSCH receptions and adaptation on DL SPS PDSCH receptions and CG PUSCH transmissions. In certain embodiments, and one or more of the BSs 101-103 includes circuitry, programing, or a combination thereof for periodicity determination of DL SPS PDSCH receptions and adaptation on DL SPS PDSCH receptions and CG PUSCH transmissions.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support periodicity determination of DL SPS PDSCH receptions and adaptation on DL SPS PDSCH receptions and CG PUSCH transmissions. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BS s over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for periodicity determination of DL SPS PDSCH receptions and adaptation on DL SPS PDSCH receptions and CG PUSCH transmissions. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
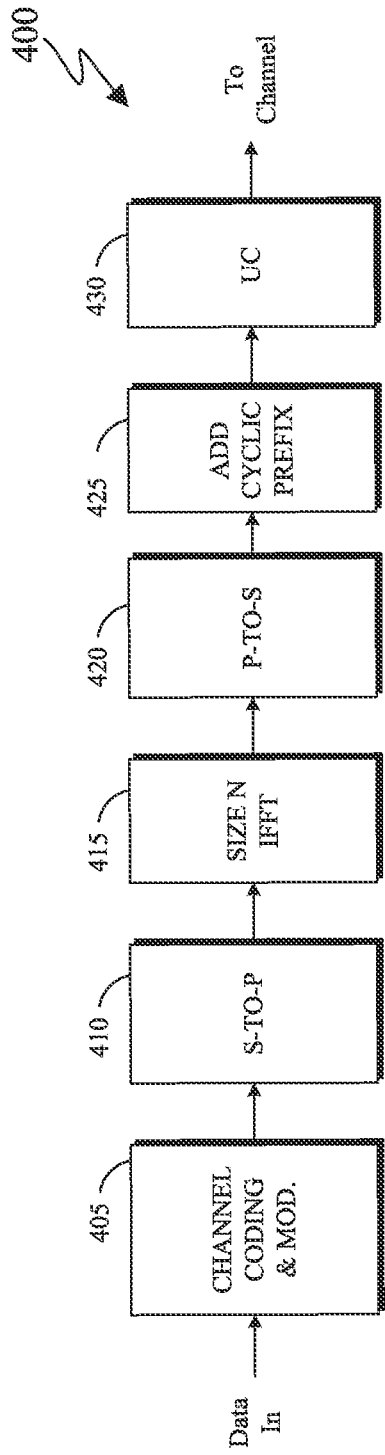
FIGS. 4 and 5 illustrate example wireless transmit and receive paths according to embodiments of the present disclosure.
Figure 5:
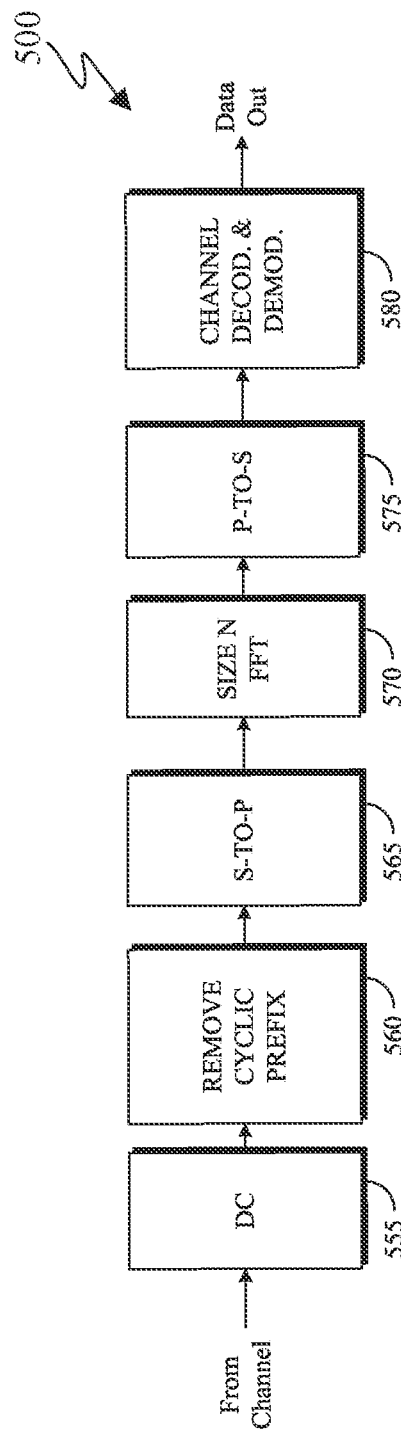

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support periodicity determination of DL SPS PDSCH receptions and adaptation on DL SPS PDSCH receptions and CG PUSCH transmissions as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a downconverter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the downconverter 555 downconverts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Extended reality (XR) services, such as augmented reality (AR), virtual reality (VR), and Cloud Gaming services, over 5G are important vertical applications for 5G commercial deployments. Several characteristics of XR traffic are summarized below and can result to new design requirements for an NR system.

One of the characteristics includes quasi periodic traffic with non-integer periodicity. Here, the arrival time or periodicity of XR traffic is more predictable than of eMBB traffic. This is because the XR video traffic has a fixed frame refresh rate. A DL video stream rate for a single UE can be 30, 60, 90, 120 frames per seconds (fps) corresponding to frame periodicities of 33.33 msec, 16.67 msec, 11.11 msec, 8.33 msec. Therefore, the periodicities of XR traffic do not match with existing periodicities of discontinuous reception (DRX) cycles, or of SPS PDSCH receptions, or of CG PUSCH transmissions that are integer multiples/sub-multiples of one msec.

Another one of the characteristics includes a time jitter for the periodic traffic arrivals. Here, the XR DL traffic arrival has a time jitter that results to a random frame arrival timing. Time jitter can be caused by random network delays for delivering packets to the radio access network or by random delays associated with the video encoder. For example, time jitter can be modeled according to a truncated Gaussian distribution. Embodiments of the present disclosure take into consideration that for certain SPS PDSCH receptions or for DRX operation, existence of jitter can negatively impact the performance in terms or latency or UE power consumption. If XR traffic arrives early for a UE at a serving gNB, transmission of packets to the UE needs to be delayed until the UE wakes up for a next DRX cycle and that increases latency. Conversely, if XR traffic arrives later than an expected time of arrival, such as a start time of a DRX On duration, the UE needs to wait while unnecessarily monitoring physical downlink control channel (PDCCH), thereby unnecessarily increasing UE power consumption which is another important metric for several XR applications, such as for smart glasses, requiring small batteries and optimized power consumption. For XR traffic that may have a small packet delay budget (PDB), such as 10 msec, jitter can negatively affect a probability that the PDB for the XR application is achieved, thereby degrading XR UE experience.

Another one of the characteristics includes time-varying packet size. Here, XR traffic consists of a Group of Pictures (GOP) that has three types of frames, intra (I) frames, predicted (P) frames, and bi-directional (B) frames. The I frame is the least compressed and the most complete frame within the GOP. For an I frame, only information contained within the I frame is compressed and there is no compression based on predictions. The first frame in a GOP is always an I frame and it is used as a reference for P and B frames. The start of a new I frame indicates a start of a new GOP sequence. P frames are compressed using interpolated data from previous I or P frames in the GOP. P frames are moderately compressed compared to I frames. B frames are the most compressed frame type. B frames are predicted using interpolated data from both prior and later I and P frames within the GOP. B frames cannot use other B frames for predictions. Both P and B frames use 'inter-frame' compression where predictions are used to compress data relative to neighboring frames. This type of compression uses a combination of complex algorithms to reduce data and retain quality.

For different frame types, video frame sizes are varying due to different compression rates. Even for a same frame type, video frame sizes can vary over time due to different compression rates based on the content of video frames. Based on real video frames, a truncated Gaussian distribution has been shown to provide an accurate representation for the frame size distribution of a video stream for AR/VR/CG.

Another one of the characteristics includes large data rate or packet size. Here, XR traffic should satisfy both a high transmission data rate, similar to eMBB traffic but unlike ultra-reliable and low latency communication (URLLC) traffic, and a small PDB, similar to URLLC traffic but unlike eMBB traffic. The combination of those metrics creates requirements that cannot be achieved by solutions available to support eMBB traffic or URLLC traffic. For 3D VR videos with high resolution, based on different frame rates, color codecs, bit-depths, compression rates and so on, a transmission data rate can exceed 60 Mbps and typical data rates range from 30 Mbps to 60 Mbps. Such high data rates limit a number of UEs that can be simultaneously supported in a given bandwidth thereby leading to low system capacity. To provide a good immersive experience for XR applications, an associated latency should be as small as possible, such as a 10 msec PDB for VR/AR or a 15 msec PDB for CG.

Another one of the characteristics includes bounded latency for video frames. For a video application, future video frames are typically encoded based on previous frames to compress the amount of required data. Therefore, if one IP packet belonging to an application data unit (ADU) is late, dropping all relevant IP packets that already arrived to RAN may be beneficial because it can avoid redundant transmissions of IP packets belonging to the ADU that may not be used for rendering. Dropping late packets can also avoid wasting radio resources and potentially increase the system capacity.

Another one of the characteristics includes high reliability. To maintain a reliable registration of the virtual world with the real world, and to ensure accurate tracking of the XR viewer's pose, the reliability requirement of XR traffic can be an error rate as low as 10e-3 or 10e-4 (0.1% or 0.01%) for both uplink (UL) and DL transmissions.

Another one of the characteristics includes high power consumption. Cloud Gaming in XR demands high throughput, high reliability and low latency in both DL and UL, and those requirements can result to high UE power consumption. XR applications can therefore increase challenges for UE battery life due to frequent and high data rate traffic, complicated computations, and frequent interaction with the network. In addition, for wearable XR devices, the size and weight should be optimized, and corresponding design requirement lead to more restrictions for battery capacity and heat dissipation compared to other devices such as smartphones.

Another one of the characteristics includes multiple flows/streams. Here, each flow/stream can have individual PDB, frame/packet size, and reliability requirements due to the characteristics of video frame. For example, an important video frame, such as an I frame, should be guaranteed transmission with high priority and high reliability, while a less important video frame, such as a P frame, may even be occasionally dropped since XR devices can have fault tolerance and recovery capability. Therefore, some SPS PDSCH receptions or CG PUSCH transmissions can be dropped occasionally, at least when they provide information corresponding to less important frames, in order to satisfy overall system requirements.

For yet another one of the characteristics includes large/frequent UL data. The traffic periodicity of UL pose/control is materially smaller than of DL video, such as for example 4 msec per pose. UE power consumption can increase when DL and UL traffic are not aligned in time because a probability that a UE can enter an idle/sleep state for power saving is substantially reduced. UE assistance information for UL data burst related information, such as data volume, arrival/waiting time, linkage among different data bursts, can be beneficial for aligning DL traffic and UL traffic as such UE assistance information can enable a gNB to adjust or update configurations for DL transmissions and/or UL scheduling.

Since XR traffic is quasi-periodic, DL SPS PDSCH and UL CG PUSCH can be considered to accommodate the XR traffic in general and video traffic in particular. However, embodiments of the present disclosure take into consideration that support for SPS PDSCH and CG PUSCH is primarily intended for URLLC and time sensitive communication (TSC) use cases having one data stream with small payloads and is therefore not appropriate for XR traffic. The disclosure considers enhancements for SPS PDSCH receptions and CG PUSCH transmissions to improve performance metrics of XR services particularly in case of multiple data flows.

For example, embodiments of the present disclosure take into consideration that certain SPS PDSCH receptions and CG PUSCH transmissions support only integer periodicities as respectively configured by higher layers in SPS-Config IE or ConfiguredGrantConfig IE. Consequently, a periodicity for a configuration of SPS PDSCH receptions, or CG PUSCH transmissions, does not match in time with a real XR traffic period of 60/90/120 fps. Also, an XR packet may arrive before or after a configured SPS PDSCH reception occasion or CG PUSCH transmission occasion.

Embodiments of the present disclosure also take into consideration that certain SPS PDSCH transmissions support only one transport block (TB) per PDSCH. However, for XR traffic, the payloads are large such as 750 Kbits per frame when an average source data rate is 45 Mbps with 60 fps. Such a frame size would often require transmission in multiple TBs. Therefore, a conventional SPS PDSCH transmission supporting one TB per PDSCH with a regular time-periodicity is not suitable for XR.

XR applications may use adaptive encoding schemes where a source data rate (and potentially a number of frames per second) can occasionally change. To address such cases, it is beneficial to consider enhancements to SPS PDSCH configurations such that an SPS PDSCH configuration can be adapted with minimal delay without having to fully release an existing one and setup a new SPS PDSCH configuration.

A UE (such as the UE 116) can be configured with multiple SPS PDSCH configurations to address multiple data streams with different bounded latency and priorities. For example, the important video frame, such as an I frame, should be guaranteed with high priority while a less important video frame, such as a P frame, may even be dropped conditionally because XR devices can have fault tolerance and recovery capability. When some configured SPS PDSCH occasion(s) are not used due to dropped packets by higher layers, a UE would unnecessarily perform SPS PDSCH reception and TB decoding, thereby unnecessarily consuming power. The UE would also generate hybrid automatic repeat request (HARQ) acknowledgement (ACK) information for absent SPS PDSCH reception, thereby unnecessarily increasing a number of required physical uplink control channel (PUCCH) resources and a PUCCH transmission power.

Embodiments of the present disclosure take into consideration that there is a need to enhance a periodicity of SPS PDSCH receptions to support XR traffic with non-integer periodicity. Accordingly, certain embodiments of this disclosure relate to enhancements on the periodicity of SPS PDSCH configuration by supporting non-integer periodicities. Embodiments of this disclosure also relate to enhancements on the periodicity of SPS PDSCH configuration by switching the periodicity over time based on a predetermined time pattern without explicit indication. Embodiments of this disclosure further relate to enhancements on the periodicity of SPS PDSCH configuration by adapting the periodicity over time based on a MAC control element (CE) in a SPS PDSCH. Additionally, embodiments of this disclosure relate to enhancements on the periodicity of SPS PDSCH configuration by adapting the periodicity over time based on indication provided by a downlink control information (DCI) format.

Additionally, embodiments of the present disclosure take into consideration that there is a need to support fast adaptation, such as through the physical layer, for parameters of SPS PDSCH receptions or CG PUSCH transmissions to support a time-varying packet size and improve a PDSCH reception or PUSCH transmission reliability. Embodiments of the present disclosure also take into consideration that there is a need to support dynamic skipping of SPS PDSCH reception or CG PUSCH transmission occasions without fully releasing a corresponding SPS PDSCH or CG PUSCH configuration when DL packets or UL packets, respectively, are dropped by higher layers. Embodiments of the present disclosure further take into consideration that there is a need to support dynamic wake-up/indication for a UE to receive SPS PDSCH or transmit CG PUSCH t without fully activating a corresponding SPS PDSCH or CG PUSCH configuration when there are bursts of DL packets or UL packets, respectively. Accordingly, certain embodiments of this disclosure relate to adaptation of parameters for SPS PDSCH receptions or CG PUSCH transmissions based on indication from a layer 1 (L1) signal/channel. Embodiments of this disclosure also relate to dynamic skipping of SPS PDSCH receptions or CG PUSCH transmissions. Embodiments of this disclosure further relate to dynamic wake-up of a UE for SPS PDSCH receptions or CG PUSCH transmissions.

The following embodiments of the present disclosure describe non-integer periodicity for DL SPS. This is described in the following examples and embodiments, such as those of FIGS. 6 and 7.

Figure 6:
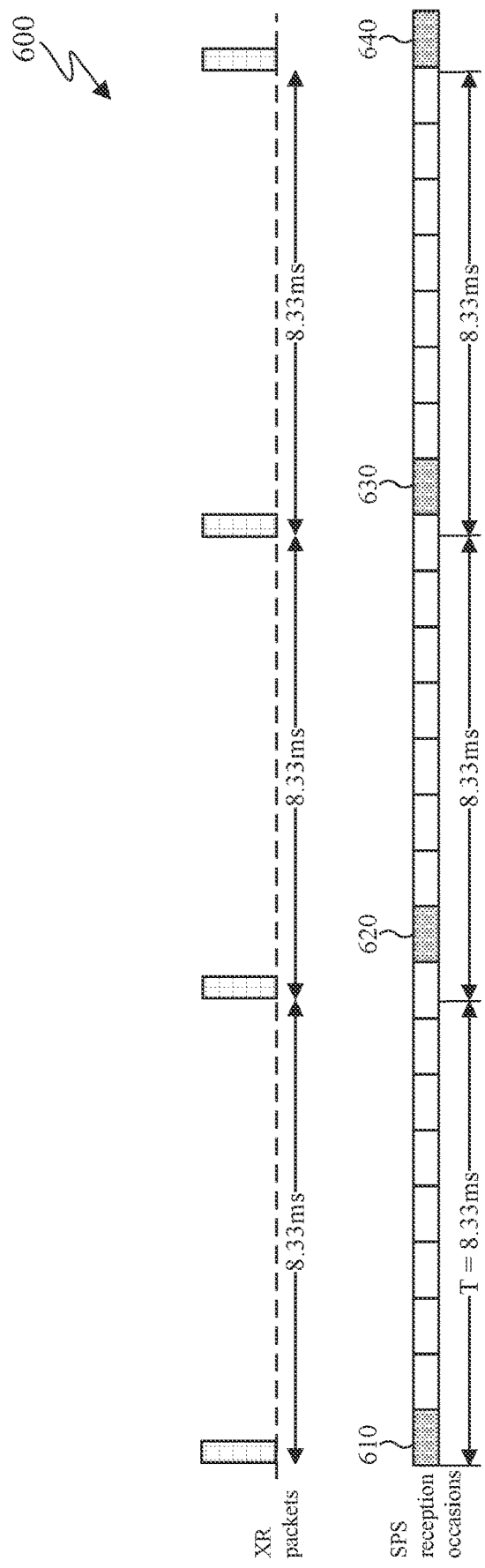
FIG. 6 illustrates an example diagram of SPS PDSCH reception timeline according to embodiments of the present disclosure.
Figure 7:
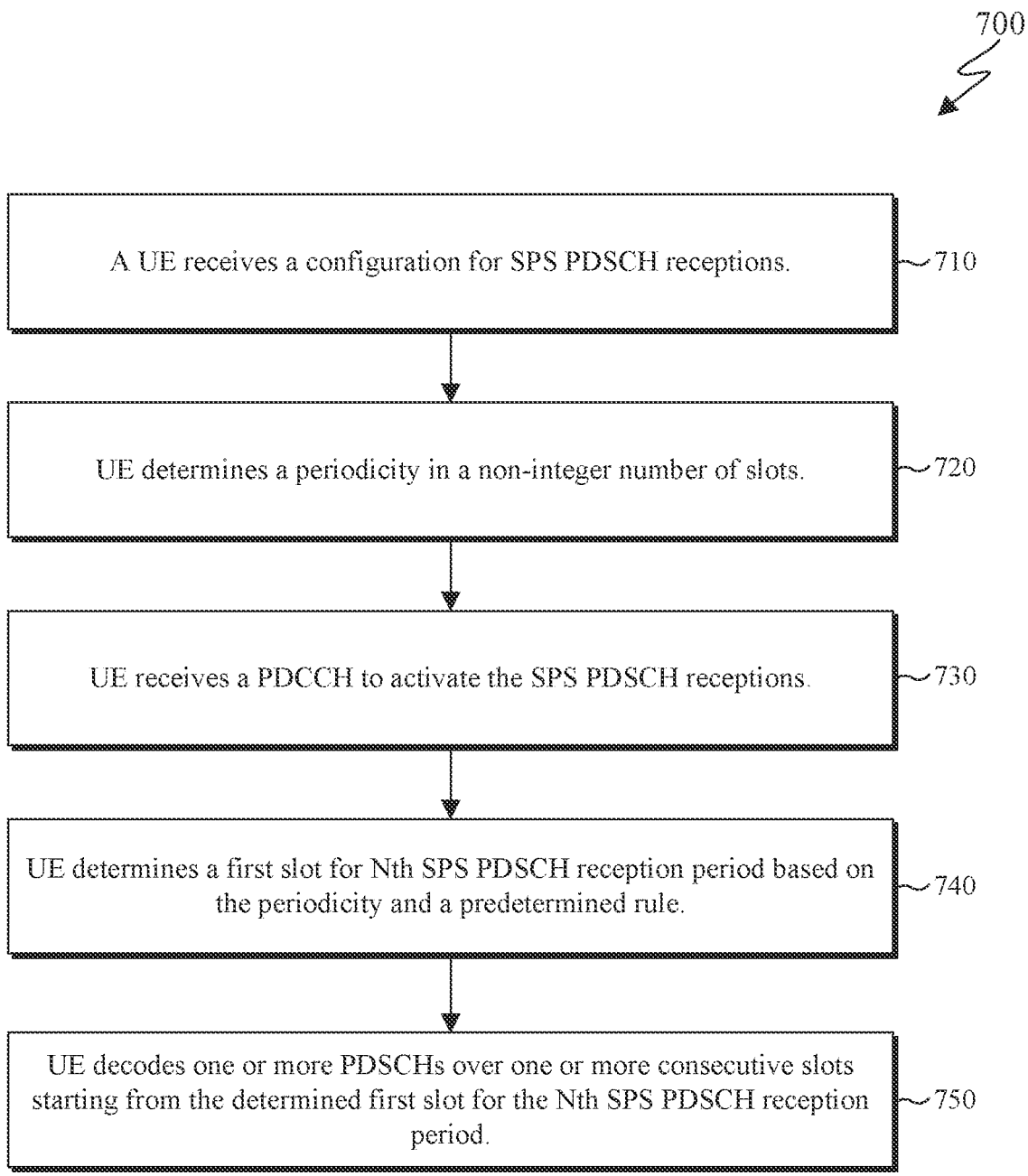
FIG. 7 illustrates an example method based on a non-integer periodicity of SPS PDSCH receptions according to embodiments of the present disclosure.

FIG. 6 illustrates an example diagram 600 of SPS PDSCH reception timeline according to embodiments of the present disclosure. FIG. 7 illustrates an example method 700 based on a non-integer periodicity of SPS PDSCH receptions according to embodiments of the present disclosure. The steps of the method 700 of FIG. 7 can be performed by any of the UEs 111-116 of FIG. 1, such as the UE 116 of FIG. 3. The diagram 600 of FIG. 6 and the method 700 of FIG. 7 are for illustration only and other embodiments can be used without departing from the scope of the present disclosure.

Certain embodiments of the present disclosure consider enhancements for determining a periodicity of SPS PDSCH receptions by supporting a non-integer periodicity. Although the embodiments are described for SPS PDSCH receptions, they are also directly applicable for CG PUSCH transmissions, for example by replacing "SPS PDSCH receptions" with "CG PUSCH transmissions".

A configuration of SPS PDSCH receptions can provide a periodicity in a non-integer number of milliseconds or in a number of OFDM symbols.

For a configuration with a non-integer periodicity, the UE (such as the UE 116) can determine the periodicity based on one of the following methods. In a first method, the periodicity can be configured in a non-integer unit of milliseconds, $T_{ms}$, for example 16.67 msec. In a second method, the periodicity $N_{symb}^{period}$ can be configured in unit of one OFDM symbol as an integer multiple K1 of the number of symbols per slot, $N_{symb}^{slot}$, and an offset K2 of a number of symbols, such that $N_{symb}^{period}$=K1+K2, wherein $0 \leq K2 \leq N_{symbs}^{slot}$. The values of K1 and K2 can be configured relative to a reference sub-carrier spacing (SCS) and can be scaled by the ratio of the SCS for the active DL bandwidth part (BWP) and the reference SCS, or can be configured separately for each SCS configuration. Equivalently, a periodicity can be expressed in milliseconds as $T_{time}^{period}=T_{slot} \cdot K1+K2 \cdot T_{symbol}$, wherein $T_{slot}$ is a slot duration in msec for a SCS configuration of the active DL BWP or for a reference SCS configuration, such as for an SCS of 15 kHz, and $T_{symbol}$ is a symbol duration in msec for a SCS configuration of the active DL BWP or for a reference SCS configuration. It is also possible to replace $T_{slot}$ with a predetermined value, such as 2 msec, 5 msec or 10 msec. The values for K1 and K2 can be provided by higher layers.

When the SPS PDSCH receptions are activated for a UE (such as the UE 116) by a DCI format in a PDCCH, the UE determines a first slot of the Nth SPS PDSCH reception period, $n_{first\_slot}^{Nth}$, for an SPS PDSCH reception. The UE can be configured to receive one or more SPS PDSCHs over a number of consecutive slots starting from slot $n_{first\ slot}{}^{Nth}$ during the Nth period. Due to the non-integer periodicity, a starting location of the Nth SPS PDSCH reception period may be anywhere in a slot. To avoid a SPS PDSCH reception across slots, the first slot of the Nth SPS PDSCH reception period, $n_{first\ slot}{}^{Nth}$ can be rounded to a next slot when a starting location of the Nth period maps to middle of a slot.

FIG. 6 illustrates the diagram 600 of an example of SPS PDSCH reception timeline based on a periodicity that is not an integer multiple/sub-multiple of one millisecond.

As illustrated in the diagram 600, a SPS PDSCH configuration includes a non-integer periodicity $T_{ms}=8.33$ ms, which can be same as for XR traffic. The UE (such as the UE 116) determines a first slot for a first reception period, 610, based on scheduling information included in a PDCCH/DCI format that activates receptions for the SPS PDSCH configuration. The UE determines a first slot of the second, the third, and the fourth reception period by rounding to the next slot based on the non-integer periodicity, in 620, 630, and 640, respectively.

For example, for a non-integer periodicity in unit of a millisecond, $T_{ms}$, a first slot for the Nth reception occasion, $n_{first\ slot}{}^{Nth}$, satisfies the following condition as described in Equation (1) below.

$$(\text{numberOfSlotsPerFrame} \times \text{SFN} + n_{first\ slot}{}^{Nth}) = [(\text{numberOfSlotsPerFrame} \times \text{SFN}_{start\_time} + \text{slot}_{start\_time}) + [N \times T_{ms} \times \text{numberOfSlotsPerFrame}/10]] \bmod (1024 \times \text{numberOfSlotsPerFrame}) \quad (1)$$

It is noted that in Equation (1), $\text{SFN}_{start\ time}$ and $\text{slot}_{start\ time}$ are the SFN and first slot, respectively, of the first transmission of the SPS PDSCH when the SPS PDSCH reception was (re-)initialized.

For example, for a non-integer periodicity in unit of a symbol, $N_{symb}{}^{period}$, a first slot for the Nth reception occasion, $n_{first\ slot}{}^{Nth}$, satisfies the following condition as described in Equation (2) below.

$$(\text{numberOfSlotsPerFrame} \times \text{SFN} + n_{first\ slot}{}^{Nth}) = [(\text{numberOfSlotsPerFrame} \times \text{SFN}_{start\_time} + \text{slot}_{start\_time}) + [N \times N_{symb}{}^{period}/\text{numberOfSymbolsPerSlot}]] \bmod (1024 \times \text{numberOfSlotsPerFrame}) \quad (2)$$

It is noted that in Equation (2), $\text{SFN}_{start\ time}$ and $\text{slot}_{start\ time}$ are the SFN and first slot index, respectively, of the first transmission of the SPS PDSCH when the SPS PDSCH reception was (re-)initialized.

For the Nth SPS PDSCH reception period starting in slot, $n_{slot}{}^{Nth}$, the UE (such as the UE 116) determines a symbol location and other parameters for a SPS PDSCH reception based on information provided in the DCI format that activated the SPS PDSCH reception.

In another method for determining the first slot of the Nth SPS PDSCH reception period, $n_{first\ slot}{}^{Nth}$, the UE (such as the UE 116) assumes that the gNB transmits the SPS PDSCH, even when the SPS PDSCH starts in a middle of a slot and the first symbol is not according to the SPS PDSCH configuration. For example, for the Nth SPS PDSCH reception period based on a non-integer periodicity in unit of a symbol, $N_{symb}{}^{period}$, the UE assumes the first slot, $n_{first\ slot}{}^{Nth}$, and the first symbol $n_{first\ symbol}{}^{Nth}$ satisfies the following condition, as described in Equation (3), below.

$$[(\text{numberOfSlotsPerFrame} \times \text{SFN} + n_{first\ slot}{}^{Nth}) \times \text{numberOfSymbolsPerSlot} + n_{first\ symbol}{}^{Nth}] = [(\text{numberOfSlotsPerFrame} \times \text{SFN}_{start\_time} + \text{slot}_{start\_time}) \times \text{numberOfSymbolsPerSlot} + \text{symbol}_{start\_time} + N \times N_{symb}{}^{period}] \bmod (1024 \times \text{numberOfSlotsPerFrame} \times \text{numberOfSymbolsPerSlot}) \quad (3)$$

It is noted that in Equation (3), $\text{SFN}_{start\ time}$, $\text{slot}_{start\ time}$, and $\text{symbol}_{start\ time}$ are the SFN, first slot index, and first symbol index, respectively, of the first transmission of the SPS PDSCH when the SPS PDSCH reception was (re-)initialized. For a non-integer periodicity in unit of a millisecond, $T_{ms}$, $T_{ms}$ can be converted to $N_{symb}{}^{period}$ based on SCS of the PDSCH.

In certain embodiments, the UE (such as the UE 116) receives scheduling information for SPS PDSCH receptions based on information provided in the DCI format that activated the SPS PDSCH reception. For a SPS PDSCH reception in a slot, the UE adjusts one or more of the scheduling information based on the number of symbols available in the slot, $N_{symbols}$, according to a predetermined mapping rule.

In one method of the predetermined mapping rule, the UE is provided a threshold of available symbols in a slot for SPS PDSCH reception, $N_{threshold}$. When $N_{symbols} \geq N_{threshold}$, the UE assumes no change of the scheduling information indicated by the DCI format in the activated PDCCH; otherwise, the UE adjusts the modulation and coding scheme (MCS) of the TB in the SPS PDSCH reception, when $N_{symbols} < N_{threshold}$. For example, when $N_{symbols} \geq N_{threshold}$, the gNB can compensate for a number of symbols for SPS PDSCH reception that is smaller than the scheduled number of symbols by increasing a transmission power. For example, the UE can adjust the MCS to a default MCS, which can be either configured by higher layers, or defined in the specifications of the system operation, e.g., the first MCS from the associated MCS table. For example, the UE can adjust the MCS to be the largest MCS of a configured MCS table that is smaller than a product of the scheduled MCS and the ratio of the number of available symbols and the number of scheduled symbols.

In another method of the predetermined mapping rule, the UE drops the SPS PDSCH reception in the slot if $N_{symbols}$ is smaller than a threshold, $N_{threshold}$, such that $N_{symbols} < N_{threshold}$.

It is noted that in the above two methods, $N_{threshold}$ can either be defined in the specifications of the system operation, e.g., $N_{threshold}=4$, or can be configured by higher layers.

In certain embodiments, when a SPS PDSCH reception in a slot includes UL symbols determined according to an UL-DL configuration provided by higher layers then, instead of dropping the SPS PDSCH reception, the UE can receive the SPS PDSCH over a number of symbols $N_{symbols}$ that exclude UL symbols, for example according to one of the above methods. Alternatively, the UE can postpone the SPS PDSCH reception to a first next slot wherein the SPS PDSCH reception does not include UL symbols. As previously mentioned, the above embodiments also apply for CG PUSCH transmissions, e.g., the UE can postpone a CG PUSCH transmission to a first next slot wherein the CG PUSCH transmission does not include DL symbols.

The method 700, as illustrated in FIG. 7 illustrates an example UE procedure based on a non-integer periodicity of SPS PDSCH receptions according to the disclosure.

In step 710, a UE (such as the UE 116) is provided a configuration for SPS PDSCH receptions. Based on the configuration, the UE in step 720 determines a periodicity in a non-integer number of slots. In step 730, the UE receives a PDCCH that provides a DCI format activating the SPS PDSCH receptions. In step 740, the UE determines a first slot for Nth SPS PDSCH reception period based on the periodicity and a predetermined rule. In step 750, the UE receives one or more PDSCHs over one or more consecutive slots starting from the determined first slot for the Nth SPS PDSCH reception period.

Although FIG. 6 illustrates the diagram 600 and FIG. 7 illustrates the method 700 various changes may be made to FIGS. 6 and 7. For example, while the method 700 is shown as a series of steps, various steps could overlap, occur in parallel, occur in a different order, or occur multiple times. In another example, steps may be omitted or replaced by other steps. For example, steps of the method 700 can be executed in a different order.

The following embodiments of the present disclosure also describe adaptations on periodicities for SPS PDSCH receptions or CG PUSCH transmissions without explicit indications. This is described in the following examples and embodiments, such as those of FIGS. 8 and 9, using SPS PDSCH receptions as an exemplary realization.

Figure 8:
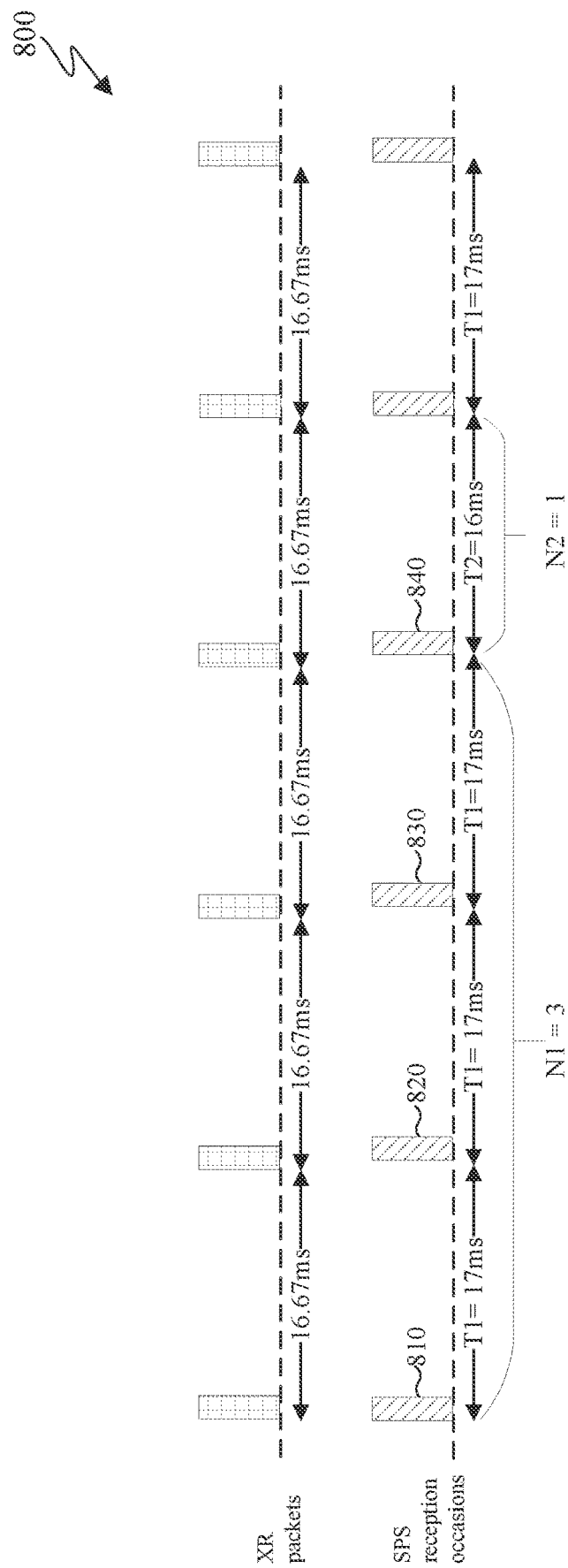
FIG. 8 illustrates an example diagram of SPS PDSCH reception timeline according to embodiments of the present disclosure.
Figure 9:
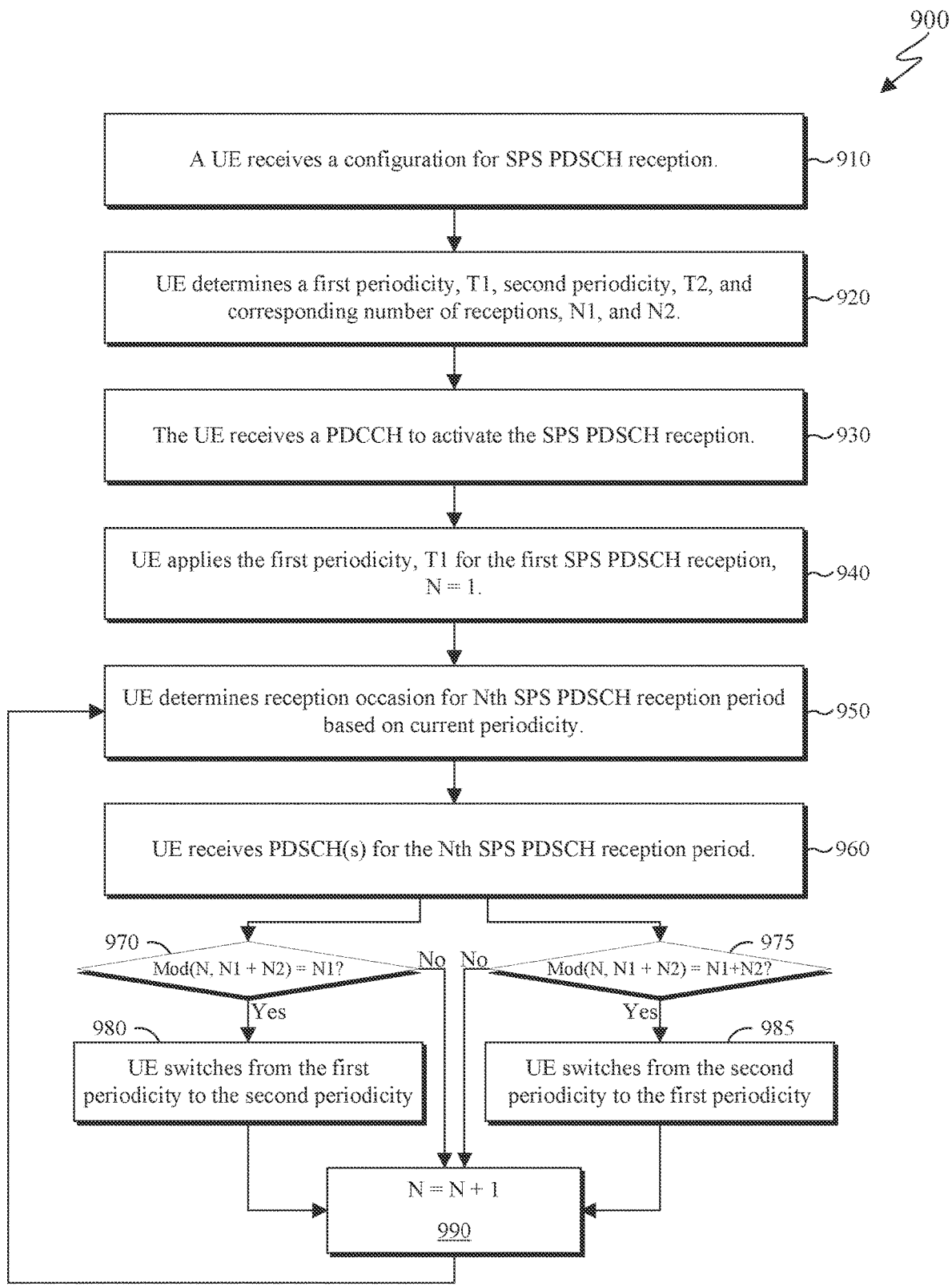
FIG. 9 illustrates an example method for adapting a periodicity for a configuration of SPS PDSCH receptions according to embodiments of the present disclosure.

FIG. 8 illustrates an example diagram 800 of SPS PDSCH reception timeline according to embodiments of the present disclosure. FIG. 9 illustrates an example method 900 for adapting a periodicity for a configuration of SPS PDSCH receptions according to embodiments of the present disclosure. The steps of the method 900 of FIG. 9 can be performed by any of the UEs 111-116 of FIG. 1, such as the UE 116 of FIG. 3. The diagram 800 of FIG. 8 and the method 900 of FIG. 9 are for illustration only and other embodiments can be used without departing from the scope of the present disclosure.

Certain embodiments of the present disclosure consider enhancements for determining a periodicity of SPS PDSCH receptions by adapting the periodicity over time based on a time pattern without explicit indication.

In certain embodiments, a UE (such as the UE 116) can be provided with a configuration for SPS PDSCH receptions. The configuration can indicate two periodicities, T1 and T2, wherein T2 is smaller than T1. The UE can switch between the two periodicities over time based on a time pattern. When the SPS PDSCH reception is activated by a DCI format in a PDCCH reception, the UE starts the SPS PDSCH receptions based on the first periodicity value, T1. After SPS PDSCH receptions for N1 periods based on T1, the UE switches to the second periodicity value, T2, which is smaller than T1. After SPS PDSCH reception for N2 periods based on T2, the UE switches back to the first periodicity value, T1.

FIG. 8 illustrates the diagram 800 of an example for an SPS PDSCH reception timeline based on adapting a periodicity of a configuration for SPS PDSCH receptions according to the disclosure.

An activated SPS PDSCH configuration includes a first periodicity T1=17 ms and a second periodicity T2=16 ms. The UE switches from T1 to T2 after N1=3 SPS PDSCH receptions, 810-830 based on T1. The UE switches from T2 to T1 after one SPS PDSCH reception, 840.

For determining applicable values of T1 and T2, T1 or T2 can be configured by higher layers, for example in the configuration of the corresponding SPS PDSCH, or provided by a MAC CE or by the DCI format activating the receptions for the SPS PDSCH configuration. Alternatively, T2 can be derived based on T1, for example, T2=T1−O, where O is an offset and can be either configured by higher layers or provided by a MAC CE or by the DCI format activating the receptions for the SPS PDSCH configuration, or can be defined in the specifications of the system operation, for example, O=1 msec. This approach can be directly generalized to more than two periodicity values.

For determining the applicable values of a number of reception times N1 associated with the first periodicity value, and a number of receptions N2 associated with the second periodicity value, N1 or N2 can be either configured by higher layers, for example in the configuration of the corresponding SPS PDSCH, or provided by a MAC CE by the DCI format activating the receptions for the SPS PDSCH configuration, or can be defined in the specifications of the system operation, for example, N1=3, N2=1.

The method 900, as illustrated in FIG. 9 describes an example UE procedure for adapting a periodicity for a configuration of SPS PDSCH receptions according to the disclosure.

In step 910, a UE (such as the UE 116) is provided a configuration for SPS PDSCH receptions. In step 920, the UE determines a first periodicity value, T1, a second periodicity value, T2, and corresponding numbers of receptions, N1 and N2. The determination can be part of the configuration for SPS PDSCH receptions or can be separately provided by a MAC CE or by a DCI format activating the SPS PDSCH receptions. In step 930, the UE receives a PDCCH providing a DCI format that activates the SPS PDSCH receptions. In step 940, the UE applies the first periodicity, T1, for the first SPS PDSCH reception. In step 950, the UE determines the reception occasion for Nth SPS PDSCH reception based on the corresponding periodicity. In step 960, the UE receives PDSCH(s) for the Nth SPS PDSCH reception.

In step 970, the UE determines whether to switch a periodicity for the SPS PDSCH receptions by determining whether N'=N1. In step 975, the UE determines whether to switch a periodicity for the SPS PDSCH receptions by determining whether N'=(N1+N2). It is noted that N'=mod (N, N1+N2).

If N'=N1 (as determined in step 970), the UE in step 980 switches from the first periodicity to the second periodicity and increases N by 1 (step 990). Alternatively, if N'=(N1+N2) (as determined in step 975), the UE in step 985 switches from the second periodicity to the first periodicity and increases N by 1, (step 711).

Alternatively, if N'≠N1 (as determined in step 970) or N'≠(N1+N2) (as determined in step 975), the UE in step 990 increases by one the number of the SPS PDSCH reception, such that N=N+1.

The UE then moves to a next SPS PDSCH reception cycle by determining a reception occasion for a next SPS PDSCH reception based on a current periodicity (step 950).

For an activated SPS PDSCH configuration, when the first periodicity T1 applies for the Nth SPS PDSCH reception, such that N'<=N1, where N'=Nmodulo(N1+N2), the UE determines a first slot for a SPS PDSCH reception period, $n_{first\ slot}^{Nth}$.

In one example, the UE (such as the UE 116) determines $n_{first\ slot}^{Nth}$ based on the condition described in Equation (4), below.

$$(\text{numberOfSlotsPerFrame} \times \text{SFN} + n_{first\ slot}^{Nth}) = [(\text{numberOfSlotsPerFrame} \times \text{SFN}_{start\_time} + \text{slot}_{start\_time}) + N' \times T2 \times \text{numberOfSlotsPerFrame}/10] \text{modulo} \\ (1024 \times \text{numberOfSlotsPerFrame}) \quad (4)$$

It is noted that in Equation (4), $\text{SFN}_{start\_time}$ and $\text{slot}_{start\_time}$ are the SFN and slot numbers, respectively, of the first SPS PDSCH reception where the configured SPS PDSCH reception was (re-)initialized, or since the last time when UE switches from the second periodicity T2 to the first periodicity T1.

In another example, the UE (such as the UE 116) determines $n_{first\ slot}^{Nth}$ based on the conditions defined in the first embodiment of this disclosure when T1 is not an integer.

For an activated SPS PDSCH configuration, when the second periodicity T2 applies for the Nth SPS PDSCH reception, such that N1<N'<=(N1+N2), where N'=N modulo (N1+N2), the UE determines a first slot of the Nth SPS PDSCH reception period, $n_{first\ slot}^{Nth}$.

In one example, the UE determines $n_{first\ slot}^{Nth}$ based on the condition described in Equation (5), below.

$$(\text{numberOfSlotsPerFrame} \times \text{SFN} + n_{first\ slot}^{Nth}) = [(\text{numberOfSlotsPerFrame} \times \text{SFN}_{start\_time} + \text{slot}_{start\_time}) + N' \times T2 \times \text{numberOfSlotsPerFrame}/10] \bmod (1024 \times \text{numberOfSlotsPerFrame}) \quad (5)$$

It is noted that in Equation (5), $\text{SFN}_{start\_time}$ and $\text{slot}_{start\_time}$ are the SFN and slot numbers, respectively, of the first SPS PDSCH reception since the last time when the UE switches from the first periodicity T1 to the second periodicity T2.

In another example, the UE determines $n_{first\ slot}^{Nth}$ based on the conditions defined in the first embodiment of this disclosure when T2 is not an integer.

Although FIG. 8 illustrates the diagram 800 and FIG. 9 illustrates the method 900 various changes may be made to FIGS. 8 and 9. For example, while the method 900 is shown as a series of steps, various steps could overlap, occur in parallel, occur in a different order, or occur multiple times. In another example, steps may be omitted or replaced by other steps. For example, steps of the method 900 can be executed in a different order.

The following embodiments of the present disclosure further describe adaptations on periodicities for SPS PDSCH receptions based on a MAC CE in a SPS PDSCH. This is described in the following examples and embodiments, such as those of FIG. 10.

Figure 10:
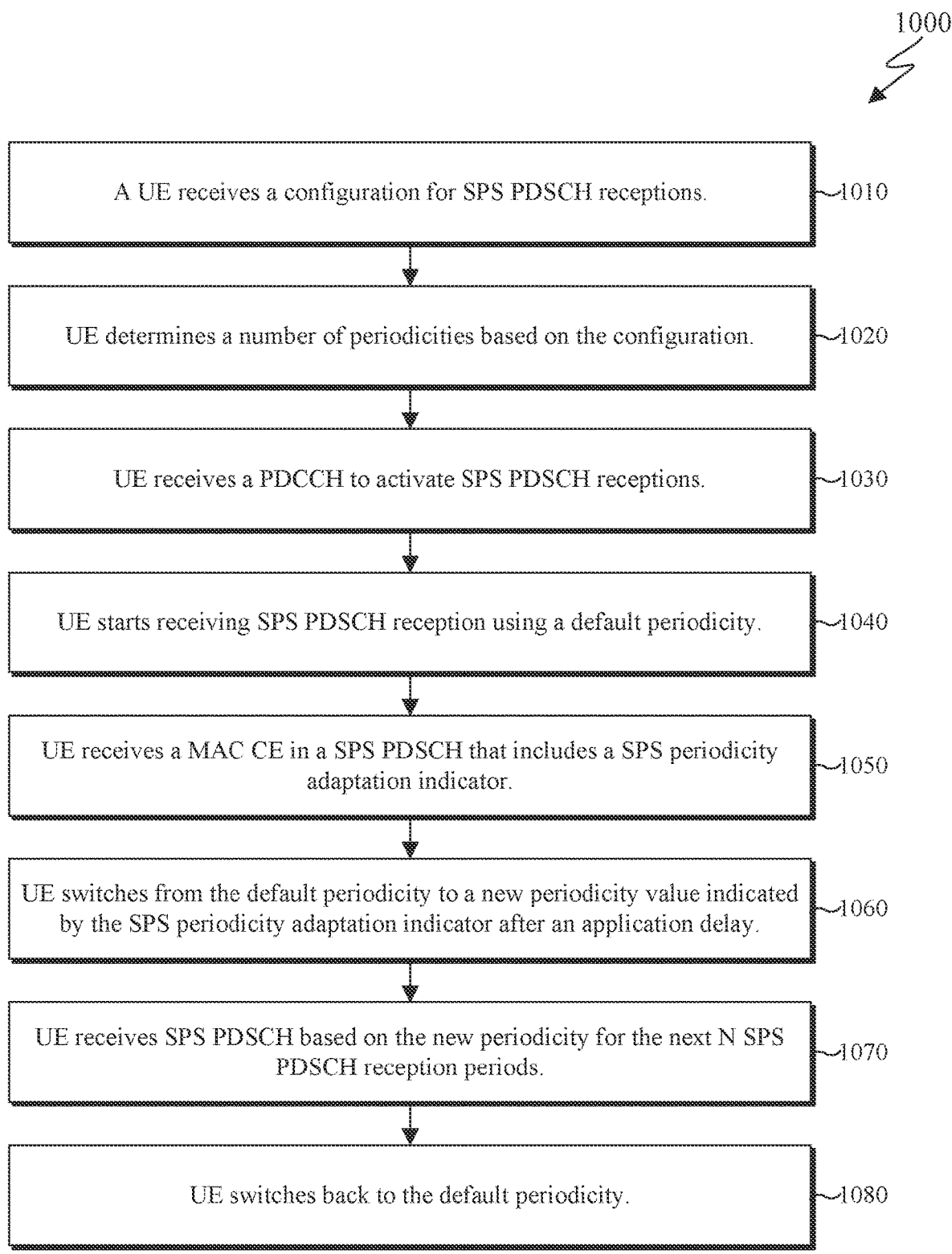
FIG. 10 illustrates an example method for adapting a periodicity for a configuration of SPS PDSCH receptions by a medium access control (MAC) coverage enhancement (CE) in a SPS PDSCH according to embodiments of the present disclosure.

FIG. 10 illustrates an example method 1000 for adapting a periodicity for a configuration of SPS PDSCH receptions by a MAC CE in a SPS PDSCH according to embodiments of the present disclosure. The steps of the method 1000 of FIG. 10 can be performed by any of the UEs 111-116 of FIG. 1, such as the UE 116 of FIG. 3. The method 1000 is for illustration only and other embodiments can be used without departing from the scope of the present disclosure.

Certain embodiments of the present disclosure consider enhancements for determining a periodicity of SPS PDSCH receptions by adapting the periodicity over time based on a MAC CE in a SPS PDSCH.

For example, a UE (such as the UE 116) can be provided a configuration for SPS PDSCH receptions, and the configuration can indicate a number of K>=1 periodicities. The UE can be indicated by a MAC CE in a SPS PDSCH reception a periodicity from the number of K>=1 periodicities, for SPS PDSCH reception in next N>=1 SPS PDSCH reception periods after an application delay for the MAC CE command.

For determining applicable values for the number of K>=1 periodicities, the applicable values can be configured by higher layers, for example in the configuration of the corresponding SPS PDSCH. Alternatively, one of the number of K>=1 periodicities, T1, can be configured by higher layers and applicable values for the remaining K−1 periodicities can be derived based on T1. For example, the kth (k=2, . . . , K) periodicity, $T_k$, can be derived such that $T_k=T_{k-1}-O$, where O is an offset that can be either configured by higher layers or be defined in the specifications of the system operation, for example, O=1 msec.

For determining an application delay for a MAC CE that indicates a new periodicity for SPS PDSCH receptions, a UE (such as the UE 116) can use one of the following methods. In a first method, the application delay is a remaining time of a current SPS PDSCH reception period wherein the UE receives the MAC CE that triggers the periodicity adaptation. For example, when the UE receives a MAC CE in a SPS PDSCH during the Nth SPS PDSCH reception in slot $n_{first\ slot}^{Nth}$, the UE determines a slot for a first SPS PDSCH reception using the new periodicity, $n_{first\ slot}^{1th}$, to be the first slot after the end of the current SPS PDSCH reception periodicity, such that $n_{first\ slot}^{1th} = n_{first\ slot}^{Nth} + T_{old} - 1$, where $T_{old}$ is the old periodicity before applying the new periodicity.

In a second method, the application delay is a time until a next slot determined by the new periodicity after the slot where the UE receives the SPS PDSCH with the MAC CE that triggers the periodicity adaptation. For example, when the UE receives a MAC CE in a SPS PDSCH during the Nth SPS PDSCH reception in slot $n_{first\ slot}^{Nth}$, the UE determines a slot for a first SPS PDSCH reception using the new periodicity, $n_{first\ slot}^{1th}$, to be the first slot after the end of the current SPS PDSCH reception periodicity, such that $n_{first\ slot}^{1th} = n_{first\ slot}^{Nth} + T_{new}$, where $T_{new}$ is the new periodicity.

In a third method, the application delay is the time between the first slot/symbol of the SPS PDSCH that includes the MAC CE and the first slot/symbol of a PUCCH/PUSCH that includes the corresponding HARQ-ACK information for the SPS PDSCH. The UE determines the first slot for the first SPS PDSCH reception period by using the new periodicity to be the first DL slot after the UL slot where the UE transmits the PUCCH/PUSCH that includes the corresponding HARQ-ACK information for the SPS PDSCH that triggers the adaptation.

In a first approach for adaptation of the periodicity for SPS PDSCH reception based on a MAC CE in a SPS PDSCH, the configuration of SPS PDSCH indicates a number of periodicities such as two periodicities, T1 and T2. When the SPS PDSCH reception is activated by a DCI format in a PDCCH reception, a SPS periodicity switching indicator included in a MAC CE in a SPS PDSCH reception indicates switching between the two periodicities. When a number of periodicities is larger than two, the new periodicity can also be indicated by the MAC CE.

In a first example, the UE assumes T1 as the default periodicity for the SPS PDSCH reception. The switching indication indicates the UE to switch from the default periodicity, T1, to the second periodicity, T2. The switching can be applicable for next N>=1 SPS PDSCH receptions, wherein the value of N is included in the switching indication. The UE starts the SPS PDSCH receptions based on the first periodicity value, T1. When the UE receives a switching indication included in a MAC CE in a SPS PDSCH, the UE switches from the first periodicity T1 to the second periodicity T1. The UE switches back to T1 after the next N SPS PDSCH reception periods.

In a second example, the switching indication can be a bit, wherein the value "0" or "1" indicates whether or not to switch from current periodicity to the other periodicity. The UE keeps current periodicity value before receiving a switching indication. The UE can start the SPS PDSCH receptions based on the first periodicity value, T1. After receiving a first switching indication by a MAC CE in a SPS PDSCH reception, the UE switches to the second periodicity value, T2. After receiving a second switching indication by a MAC CE in a SPS PDSCH reception, the UE switches back to the first periodicity value, T1.

In a first approach for adaptation of the periodicity for SPS PDSCH reception based on a MAC CE in a SPS PDSCH, the configuration of SPS PDSCH indicate a number of $K>=1$ periodicities. A MAC CE in a SPS PDSCH reception includes a SPS periodicity adaptation indicator that indicates a periodicity value from the number of $K>=1$ periodicities. After receiving a MAC CE in a SPS PDSCH reception that includes a SPS periodicity adaptation indicator, the UE changes current periodicity value to the periodicity value indicated by the periodicity adaptation indicator for next N SPS PDSCH reception periods.

The UE (such as the UE 116) can determine the value of N based on one of the following methods. In one method, N can be infinity, such that the UE doesn't change periodicity value for the SPS PDSCH reception until the UE receives a next MAC CE that includes a new periodicity adaptation indicator. In a second method, N is configured by higher layers. For example, in the configuration of the SPS PDSCH reception. In a third method, the value of N is included in the same MAC CE that includes the SPS periodicity adaptation indicator. In a fourth method, the value of N is fixed, for example, N=1 such as when the MAC CE is included in each SPS PDSCH reception. The MAC CE that includes a SPS periodicity adaptation indicator can be a last SPS PDSCH reception with the previous periodicity value when the periodicity is larger than an application delay for the MAC CE command.

The method 1000, as illustrated in FIG. 10, describes an example UE procedure for adapting a periodicity for a configuration of SPS PDSCH receptions by a MAC CE in a SPS PDSCH.

In step 1010, a UE (such as the UE 116) is provided a configuration for SPS PDSCH receptions. In step 1020, the UE determines a number of periodicities based on the configuration. In step 1030, the UE receives a PDCCH providing a DCI format that activates SPS PDSCH receptions for the configuration. In step 1040, the UE starts receiving the SPS PDSCH using a default periodicity. For example, the default periodicity is the first periodicity from the number of periodicities. Alternatively, the default periodicity can be indicated by the DCI format.

In step 1050, the UE receives a MAC CE in a SPS PDSCH that includes a SPS periodicity adaptation indicator. In step 1060, the UE switches from the default periodicity to a new periodicity value indicated by the SPS periodicity adaptation indicator after an application delay. In step 1070, the UE receives SPS PDSCH based on the new periodicity for the next $N>=1$ SPS PDSCH reception periods. In step 1080, the UE switches back to the default periodicity.

Although FIG. 10 illustrates the method 1000 various changes may be made to FIG. 10. For example, while the method 1000 is shown as a series of steps, various steps could overlap, occur in parallel, occur in a different order, or occur multiple times. In another example, steps may be omitted or replaced by other steps. For example, steps of the method 1000 can be executed in a different order.

Additionally, the following embodiments of the present disclosure describe adaptations on periodicities for SPS PDSCH receptions based on DCI format. This is described in the following examples and embodiments, such as those of FIG. 11.

Figure 11:
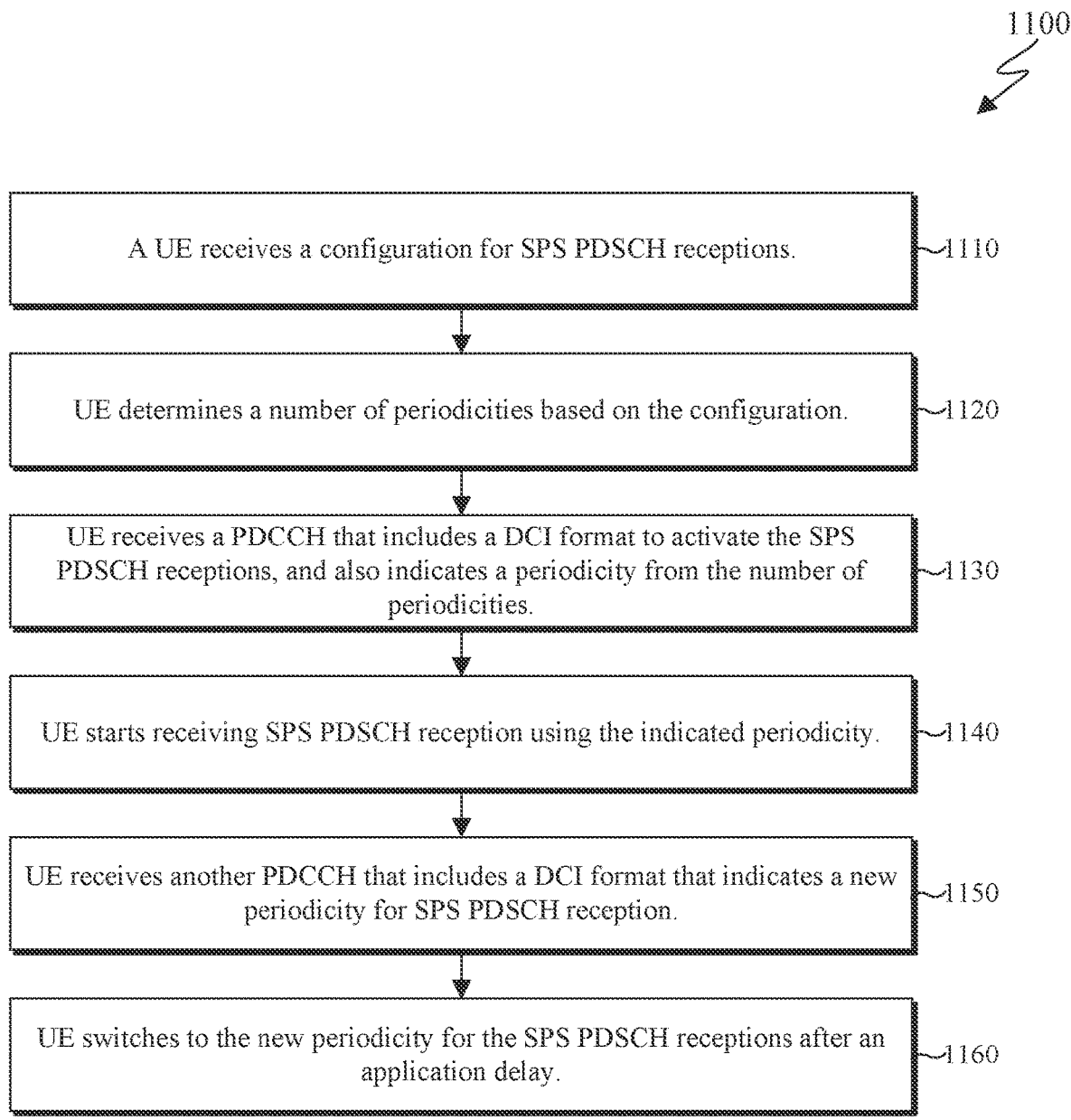
FIG. 11 illustrates an example method for adapting a periodicity for SPS PDSCH receptions based on a DCI format according to embodiments of the present disclosure.

FIG. 11 illustrates an example method 1100 for adapting a periodicity for SPS PDSCH receptions based on a DCI format according to embodiments of the present disclosure. The steps of the method 1100 of FIG. 11 can be performed by any of the UEs 111-116 of FIG. 1, such as the UE 116 of FIG. 3. The method 1100 is for illustration only and other embodiments can be used without departing from the scope of the present disclosure.

Certain embodiments of the present disclosure consider enhancements for determining a periodicity of SPS PDSCH receptions by adapting the periodicity over time based on a DCI format.

A UE (such as the UE 116) can be provided with one or more configurations of SPS PDSCH receptions. A configuration of SPS PDSCH receptions can indicate a number of $K>=1$ periodicities. The UE can be indicated by a DCI format a periodicity from the number of $K>=1$ periodicities, for SPS PDSCH receptions.

For determining applicable values for the number of $K>=1$ periodicities, the applicable values can be configured by higher layers, for example in the configuration of the corresponding SPS PDSCH. Alternatively, one of the number of $K>=1$ periodicities is configured by higher layers, T1, and the applicable values for the remaining K-1 periodicities can be derived based on T1. For example, the kth (k=2, . . . , K) periodicity, $T_k$, can be derived, such that $T_k=T_{k-1}-O$, where O is an offset, and can be either configured by higher layers or be defined in the specifications of the system operation, for example, O=1 msec.

For determining the DCI format that triggers an adaptation of a periodicity for a number of SPS configuration(s), one of the following methods can be considered. In one method, the DCI format can be the DCI format that activates the SPS PDSCH reception. For example, the DCI format can be DCI format 1_1 or DCI format 1_2 with cyclic redundancy check (CRC) bits scrambled by a Configured scheduling (CS) Radio Network Temporary Identifier (RNTI). The DCI format indicates activation of a configuration for SPS PDSCH reception and additionally includes a field to indicate a periodicity for the SPS PDSCH reception.

In another method, the UE can be configured to receive PDCCH candidates for detection of the DCI format according to a common search space set. The UE can be provided by higher layers a starting location in the DCI format for a block of bits. A block of bits can include a number of fields, where each field indicates a periodicity for a configuration of SPS PDSCH reception. The number of fields equals to the number of configurations of SPS PDSCH receptions the UE receives.

For determining PDCCH monitoring occasions for detection of the DCI format that triggers an adaptation of a periodicity for a number of SPS configuration(s), one of the following methods can be considered. In a first method, the UE determines the PDCCH monitoring occasions for detection of the DCI format based on a configuration of corresponding search space set(s). The search space set(s) can be associated with a SPS configuration for periodicity adaptation. For example, the periodicity of the search space set, $T_{sss}$, can be configured to be an integer multiple of the periodicity of the associated SPS configuration, $T_{sps}$, such that $T_{sss}=L\times T_{sym}$, wherein L is an integer and the UE monitors PDCCH for detection of the DCI format every L SPS PDSCH reception periods. For another example, the UE also monitors the DCI format for activation of the SPS configuration in the search space set(s). If the SPS configuration is activated by a DCI format detected in one of the search space set(s), the UE starts monitoring the search space set(s) for detection of the DCI format to trigger periodicity adaptation for the SPS configuration; otherwise, the UE doesn't expect to monitor the search space set(s) for detection of the DCI format to trigger periodicity adaptation for the SPS configuration.

In a second method, the reception occasions of PDCCH candidates providing the DCI format are associated with a DRX cycle when the UE is configured with DRX operation in RRC_CONNECTED state. The UE can be provided by higher layers an offset, O, which indicates a time where the UE starts monitoring PDCCH for detection of the DCI format according to configured search space set(s), prior to a first slot of a DRX ON duration. The adaptation of a periodicity for SPS PDSCH reception provided by the DCI format can apply to SPS PDSCH receptions within a next number of N≥1 DRX ON durations, wherein N can be provided by higher layers or also be indicated by the DCI format, and the UE monitors PDCCH for detection of the DCI format prior to a DRX ON duration every N DRX cycles. In one example, the DCI format can be a DCI format 2_6 with CRC scrambled by power savings (PS) RNTI. The DCI format 2_6 can include a wake-up indicator that indicates whether or not the UE needs to receive SPS PDSCHs during an active time of next N≥1 DRX cycles, and the periodicity for SPS PDSCH receptions.

In certain embodiments, when a UE (such as the UE 116) receives a DCI format in a PDCCH to indicate a new periodicity for SPS PDSCH receptions, the UE applies the adaptation after an application delay, $T_{delay}$. When the UE receives a DCI format during the Nth SPS PDSCH reception period with first slot, $n_{first\_slot}^{Nth}$, the UE determines the first slot for the first SPS PDSCH reception period by using the new periodicity, $n_{first\_slot}^{1th}$, based on the application delay, such that $n_{first\_slot}^{1th} = n_{first\_slot}^{Nth} + T_{delay}$. The value of application delay can be determined based on one of the following methods.

In a first method, $T_{delay}$ is defined in the specifications of the system operation. For example, $T_{delay}=1$ ms or 1 slot.

In a second method, $T_{delay}$ is configured by higher layers.

In a third method, $T_{delay}$ is determined based on UE capability. The UE reports its capability for $T_{delay}$ to a serving cell.

In a fourth method, $T_{delay}=0$ when the DCI format to indicate the new periodicity is the same DCI format that activates the SPS PDSCH reception.

The method 1100, as illustrated in FIG. 11 describes an example UE procedure for adapting a periodicity for SPS PDSCH receptions based on a DCI format.

In step 1110, a UE (such as the UE 116) is provided a configuration for SPS PDSCH receptions. In step 1120, the UE determines a number of K>=1 periodicities based on the configuration. In step 1130, the UE receives a PDCCH providing a DCI format that activates the SPS PDSCH reception, and the DCI format also indicates a periodicity from the number of K>=1 periodicities. In step 1140, the UE starts receiving the SPS PDSCH using the indicated periodicity. In step 1150, the UE receives another PDCCH that includes a DCI format that indicates a new periodicity for SPS PDSCH reception. In step 1160, the UE switches to the new periodicity for the SPS PDSCH receptions after an application delay.

Although FIG. 11 illustrates the method 1100 various changes may be made to FIG. 11. For example, while the method 1100 is shown as a series of steps, various steps could overlap, occur in parallel, occur in a different order, or occur multiple times. In another example, steps may be omitted or replaced by other steps. For example, steps of the method 1100 can be executed in a different order.

The following embodiments of the present disclosure describe dynamic adaptation of SPS PDSCH receptions or CG PUSCH transmissions. This is described in the following examples and embodiments, such as those of FIGS. 12, 13 and 14.

Figure 12:
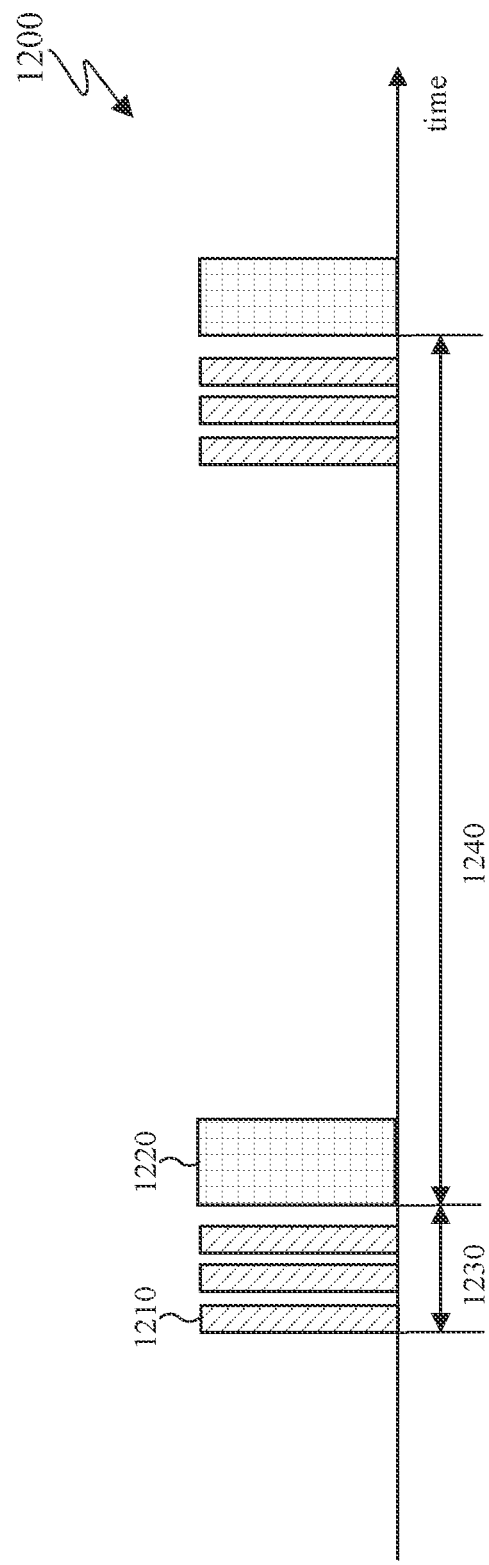
FIG. 12 illustrates an example diagram of a timeline according to embodiments of the present disclosure.
Figure 13:
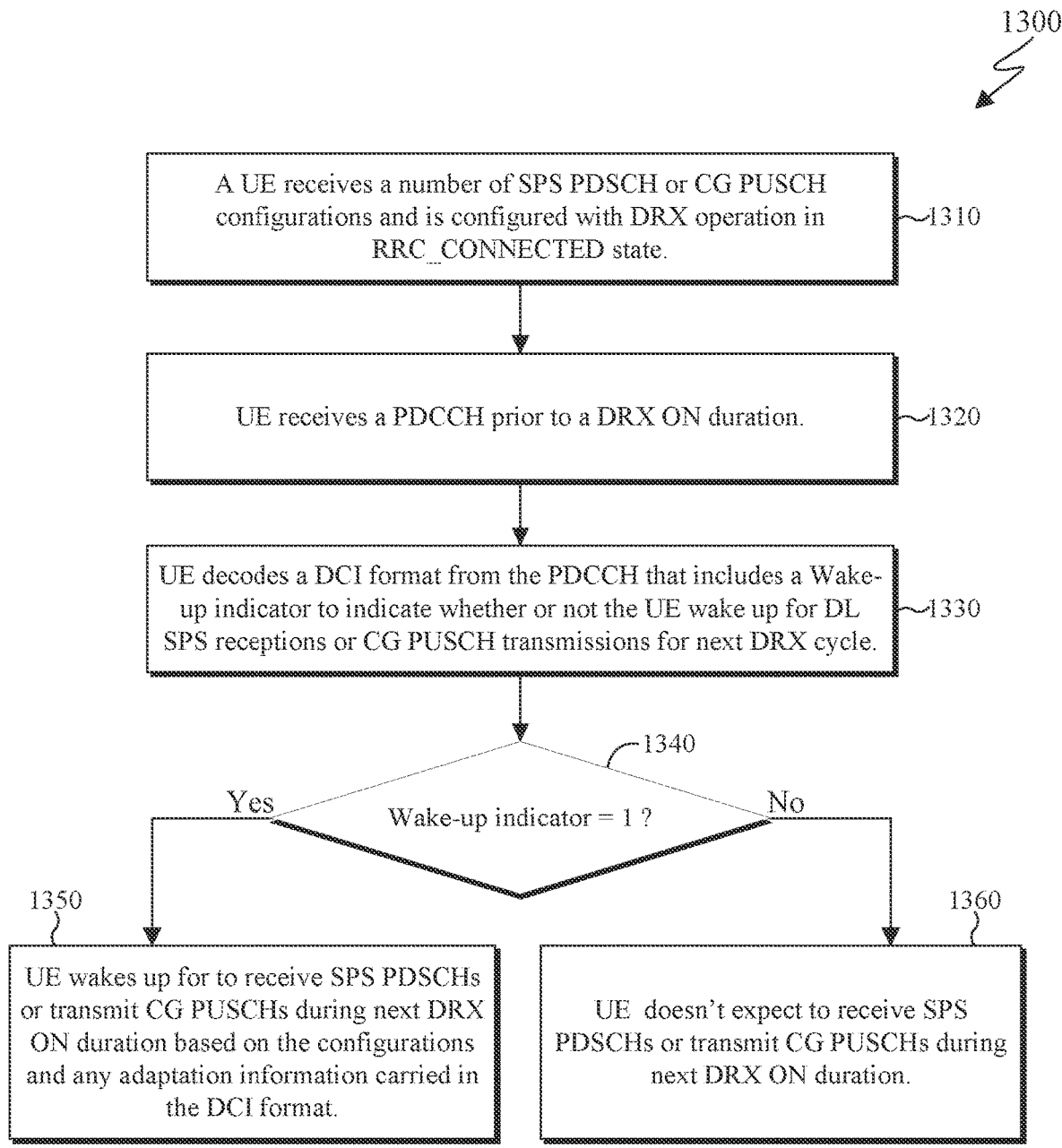
FIG. 13 illustrates an example method for adaptation of parameters for SPS PDSCH receptions or CG PUSCH transmissions based on a DCI format provided by a physical downlink control channel (PDCCH) reception outside a discontinuous reception (DRX) active time according to embodiments of the present disclosure.
Figure 14:
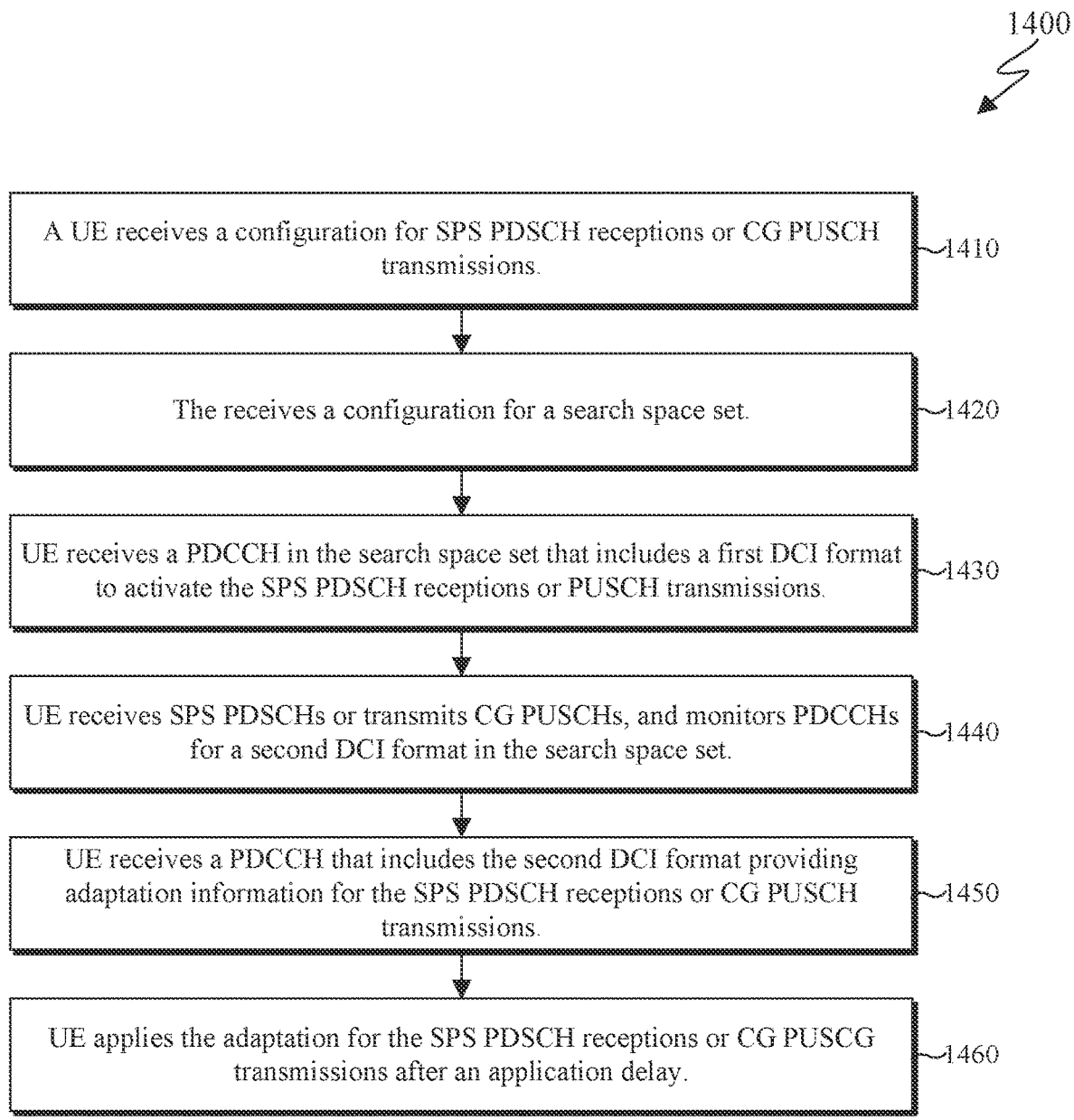
FIG. 14 illustrates an example method for adaptation of parameters for SPS PDSCH receptions or CG-PUSCH transmissions based on a DCI format provided by a PDCCH reception according to embodiments of the present disclosure.

FIG. 12 illustrates an example diagram 1200 of a timeline according to embodiments of the present disclosure. FIG. 13 illustrates an example method 1300 for adaptation of parameters for SPS PDSCH receptions or CG-PUSCH transmissions based on a DCI format provided by a PDCCH reception outside a DRX active time according to embodiments of the present disclosure. FIG. 14 illustrates an example method 1400 for adaptation of parameters for SPS PDSCH receptions or CG-PUSCH transmissions based on a DCI format provided by a PDCCH reception according to embodiments of the present disclosure. The steps of the method 1300 of FIG. 13 and the method 1400 of FIG. 14 can be performed by any of the UEs 111-116 of FIG. 1, such as the UE 116 of FIG. 3. The diagram 1200 of FIG. 12, the method 1300 of FIG. 13, and the method 1400 of FIG. 14 are for illustration only and other embodiments can be used without departing from the scope of the present disclosure.

Certain embodiments of the present disclosure consider enhancements adaptation of parameters for SPS PDSCH receptions or CG PUSCH transmissions based on indication from a L1 signal/channel.

A UE (such as the UE 116) can be configured a number of SPS PDSCH configurations in a DL BWP of a serving cell, wherein a SPS PDSCH configuration can include any configuration parameter from SPS-Config in REF 6, or more configuration parameters, such as a number or TBs per PDSCH, or a number of PDSCHs, for the UE to receive per SPS PDSCH reception period.

In certain embodiments, when a SPS PDSCH configuration is activated for a UE (such as the UE 116) by a DCI format in a PDCCH, the UE receives SPS PDSCHs periodically based on parameters either provided by the configuration or by the DCI format that activates the SPS PDSCH configuration. The UE can monitor and receive an L1 signal/channel, such as a DCI format provided by a PDCCH, for adaptation on some of the parameters without reconfiguration or re-initialization the entire SPS PDSCH configuration.

The UE can be configured a number of CG PUSCH configurations in a UL BWP of a serving cell, wherein a CG PDSCH configuration can include any configuration parameter from ConfiguredGrantConfig in REF 6, or more configuration parameters, such as a number or TBs per PUSCH, or a number of PUSCHs, for the UE to receive per CG PUSCH transmission period.

When a CG PUSCH configuration is activated for a UE (such as the UE 116) by higher layers or by a DCI format in a PDCCH, the UE transmits CG PUSCH periodically based on parameters either provided by the configuration or by the DCI format that activates the CG PUSCH configuration. The UE can monitor and receive an L1 signal/channel, such as a DCI format provided by a PDCCH, for adaptation on some of the parameters without reconfiguration or re-initialization the entire CG PUSCH configuration.

An adaptation of parameters for SPS PDSCH receptions or CG PUSCH transmission can enable a serving gNB to improve a corresponding spectral efficiency and provide power savings for the UE operation. The L1 signal/channel can be a PDCCH that includes a DCI format. The UE can be configured with at least one search space set to receive PDCCH candidates for detection of the DCI format triggering an adaptation of parameters for a number of SPS PDSCH receptions or CG PUSCH transmissions.

For determining the DCI format triggering an adaptation of parameters for a number of K>=1 SPS PDSCH receptions or CG PUSCH transmissions, one of the following methods can be used. In a first method, the DCI format can be any of the DCI formats that can be used to activate SPS PDSCH receptions or CG PUSCH transmissions. For example, the DCI format can be DCI format 1_1, DCI format 0_1, DCI format 1_2, or DCI format 0_2 with CRC bits scrambled by a CS-RNTI. The DCI format indicates activation of one or more configuration(s) for SPS PDSCH reception and CG PUSCH transmission and additionally include a number of field(s) to indicate adaptation of parameters for the SPS PDSCH reception or CG PUSCH transmission.

In a second method, the UE can be configured to receive PDCCH candidates for detection of the DCI format according to a common search space set. The UE can be provided by higher layers a starting location in the DCI format for a block of bits and, when a number of bits in a block of bits is not predetermined in the specifications of the system operation, the number of bits in the block of bits. A block of bits can include a number of fields for adaptation of SPS PDSCH receptions or CG PUSCH transmissions by the UE.

In a third method, the DCI format can be a DCI format that schedules a retransmission of a SPS PDSCH. When a UE (such as the UE 116) receives a DCI format with CRC scrambled by CS-RNTI, and the DCI format indicates a retransmission of a SPS PDSCH, the UE can be configured to use some of the scheduling information in the DCI format, such as an MCS, for subsequent SPS PDSCH receptions.

In certain embodiments, a field from the number of field(s) included in the DCI format triggering an adaptation of parameters for a number of K>=1 SPS PDSCH receptions can be any of the following. For a first example, the field can be a number of TBs per SPS PDSCH reception. For example, the DCI format can include a field to indicate a number from a set of applicable numbers that are configured by higher layers.

For another example, the field can be a group ID to indicate a group of SPS PDSCH configurations for activation. The UE can be provided with a group ID for each of the configurations of SPS PDSCH reception. The field in the DCI format indicates one group ID, wherein the UE expects to apply the activation indication to a set of one or more SPS PDSCH configurations that are associated with the indicated group ID.

For another example, the field can be a number of slots for one TB SPS PDSCH reception or CG PUSCH transmission.

For another example, the field can be S≥1 SPS configuration indexes to apply the adaptation information provided by the DCI format. For example, the field can be a bitmap, and each bit of the bitmap is associated with a SPS PDSCH configuration. A bit of the bitmap indicates whether or not to apply the adaptation information to the associated SPS PDSCH configuration. When this field is not included in the DCI format, the UE can assume that the adaptation information provided by the DCI format is applicable to all activated SPS configurations in the active DL BWP of a serving cell.

For another example, the field can be a MCS field. The MCS field can provide an actual MCS value or a differential MCS value, $d_{MCS}$, relative to an MCS value, $v_{MCS}$, and the UE updates the MCS value, $v_{MCS}$, for SPS PDSCH receptions as $v_{MCS}=v_{MCS}+d_{MCS} \cdot v_{MCS}$ can be either provided by higher layers for the corresponding configuration of SPS PDSCH receptions or be provided by a DCI format that activates the corresponding configuration of SPS PDSCH reception.

For another example, the field can be a transmission configuration indication (TCI) state indicator to indicate a TCI state from a set of configured TCI states. When the TCI state indicator field is not included in the DCI format, the UE can assume that the TCI state or the quasi co-located (QCL) assumption for SPS PDSCH receptions for a corresponding SPS configuration is the TCI state or QCL assumption of the control resource sets (CORESET) used for the PDCCH reception that includes the DCI format.

For another example, the field can be a code block group (CBG) information to indicate a number of CBGs per TB.

For another example, the field can be a channel state information (CSI) request, to indicate parameters for a CSI reference signal (RS) reception and for a CSI report.

For yet another example, the field can be a periodicity. The periodicity field can provide a differential periodicity value, $d_{periodicity}$, relative to an default value, $v_0$, and the UE updates the periodicity, $v_{periodicity}$, for SPS PDSCH receptions, such that $v_{periodicity}=v_0+d_{periodicity}$. The differential periodicity value $d_{periodicity}$ can be either provided by higher layers for the corresponding configuration of SPS PDSCH receptions or be provided by a DCI format that activates or adapts the corresponding configuration of SPS PDSCH reception.

In certain embodiments, a field from the number of field(s) included in the DCI format triggering an adaptation of parameters for a number of K>=1 CG PUSCH transmissions can be any of the following. For a first example the field can be a number of TBs per CG PUSCH transmission. For example, the DCI format can include a field to indicate a number from a set of applicable numbers that are configured by higher layers.

For another example, the field can be a group ID to indicate a group of CG PUSCH configurations for activation. The UE can be provided with a group ID for each of the configurations of CG PUSCH transmission. The field in the DCI format indicates one group ID, wherein the UE expects to apply the activation indication to a set of one or more CG PUSCH configurations that are associated with the indicated group ID.

For another example, the field can be S≥1 CG PUSCH configuration indexes to apply the adaptation information provided by the DCI format. For example, the field can be a bitmap, and each bit of the bitmap is associated with a CG PUSCH configuration. A bit of the bitmap indicates whether or not to apply the adaptation information to the associated CG PUSCH configuration. When this field is not included in the DCI format, the UE can assume that the adaptation information provided by the DCI format is applicable to all activated CG PUSCH configurations in the active UL BWP of a serving cell.

For another example, the field can be a MCS field. The MCS field can provide an actual MCS value or a differential MCS value, $d_{MCS}$, relative to an MCS value, $v_{MCS}$, and the UE updates the MCS value, $v_{MCS}$, for CG PUSCH transmissions as $v_{MCS}=v_{MCS}+d_{MCS} \cdot v_{MCS}$ can be either provided by higher layers for the corresponding configuration of CG PUSCH transmissions or be provided by a DCI format that activates the corresponding configuration of CG PUSCH transmission.

For another example, the field can be a transmission configuration indication (TCI) state indicator to indicate a TCI state from a set of configured TCI states. When the TCI state indicator field is not included in the DCI format, the UE can assume that the TCI state or the QCL assumption for CG PUSCH transmissions for a corresponding CG PUSCH configuration is the TCI state or QCL assumption of the CORESET used for the PDCCH reception that includes the DCI format.

For another example, the field can be CBG information to indicate a number of CBGs per TB.

For another example, the field can be sounding reference signal (SRS) request, to indicate parameters for an SRS transmission.

For another example, the field can be a periodicity. The periodicity field can provide a differential periodicity value, $d_{periodicity}$, relative to an default value, $v_0$, and the UE updates the periodicity, $v_{periodicity}$, for CG PUSCH transmissions, such that $v_{periodicity} = v_0 + d_{periodicity}$. The differential periodicity value $d_{periodicity}$ can be either provided by higher layers for the corresponding configuration of CG PUSCH transmissions or be provided by a DCI format that activates or adapts the corresponding configuration of CG PUSCH transmission.

For yet another example, the field can be an offset. The offset field can provide a differential offset value, $d_{offset}$, relative to an default value, $v_0$, and the UE updates the offset, $v_{offset}$, for CG PUSCH transmissions, such that $v_{offset} = v_0 + d_{offset}$. The differential offset value $d_{offset}$ can be either provided by higher layers for the corresponding configuration of CG PUSCH transmissions or be provided by a DCI format that activates or adapts the corresponding configuration of CG PUSCH transmission.

In certain embodiments, for determining reception occasions of PDCCH candidates providing the DCI format triggering an adaptation of parameters for a number of K>=1 SPS PDSCH receptions or CG PUSCH transmissions, one of the following methods can be used. In a first method, the reception occasions are based on a configuration of corresponding search space set(s). The search space set(s) can be associated with a SPS configuration or a CG PUSCH configuration for applying the adaptation. For example, a periodicity of a search space set, $T_{sss}$, can be configured to be an integer multiple of a periodicity of an associated SPS configuration or CG PUSCH configuration, $T_{cs}$, such that $T_{sss} = L \times T_{cs}$, wherein L is an integer and the UE monitors PDCCH for detection of a DCI format providing an adaptation for parameters of a SPS configuration or CG PUSCH configuration every L SPS PDSCH reception periods or CG PUSCH transmission periods. For another example, the UE also monitors a DCI format for activation of the SPS configuration or CG PUSCH configuration in the search space set(s). If the SPS configuration or CG PUSCH configuration is activated by a DCI format detected in a PDCCH that is received according to one of the search space set(s), the UE starts monitoring the search space set(s) for detection of the DCI format to trigger an adaptation for the SPS configuration or the CG PUSCH configuration; otherwise, the UE does not expect to monitor the search space set(s) for detection of the DCI format to trigger an adaptation for the SPS configuration or the CG PUSCH configuration.

In a second approach, the reception occasions are associated with a DRX cycle when the UE is configured with DRX operation in RRC_CONNECTED state. The UE can be provided by higher layers an offset, O, which indicates a time where the UE starts monitoring PDCCH for detection of the DCI format according to configured search space set(s), prior to a first slot of a DRX ON duration. The adaptation information provided by the DCI format can apply to SPS PDSCH receptions or CG PUSCH transmissions within a next number of N≥1 DRX ON durations, wherein N can be provided by higher layers or be indicated by the DCI format, and the UE monitors PDCCH for detection of the DCI format prior to a DRX ON duration every N DRX cycles. In one example, the DCI format can be a DCI format 2_6 with CRC scrambled by PS-RNTI. The DCI format 2_6 can include a wake-up indicator that indicates whether or not the UE needs to receive SPS PDSCHs or transmit CG PUSCHs during an active time of next N≥1 DRX cycles, and any of the other adaptation information previously described in the present embodiment.

The diagram 1200 as illustrated in FIG. 12 illustrates a timeline for adaptation of parameters for SPS PDSCH receptions or CG PUSCH transmissions based on an L1 signal/channel received outside a DRX active time according to the disclosure.

As illustrated, a UE (such as the UE 116) is configured for DRX operation in connected mode with DRX cycle, 1240. The UE is configured one or more search space set(s) for detection of a DCI format providing an adaptation of parameters for SPS PDSCH receptions or CG PUSCH transmissions within a next DRX ON duration. The UE is configured a time offset, 1230, relative to/before a start of a first slot of the next DRX ON duration, 1220. The UE expects to monitor PDCCH, 1210, for detection of the DCI format in monitoring occasions that are determined by the time offset.

In certain embodiments, when a UE (such as the UE 116) receives a DCI format in a PDCCH to indicate an adaptation for SPS PDSCH receptions or CG PUSCH transmissions in a slot with slot index, $n_{trigger}$, the UE applies the adaptation at a first slot that is after an application delay, $T_{delay}$, from the slot $n_{trigger}$. The value of application delay can be determined based on one of the following methods. In a first method, $T_{delay}$ is defined in the specifications of the system operation. For example, $T_{delay} = 1$ ms or 1 slot.

In a second method, $T_{delay}$ is configured by higher layers.

In a third method, $T_{delay}$ is determined based on UE capability. The UE reports its capability for $T_{delay}$ to a serving cell.

In a fourth method, $T_{delay} = 0$ when the DCI format is the same DCI format that activates the SPS PDSCH receptions or CG PUSCH transmissions.

In a fifth method, $T_{delay}$ is included in the DCI format.

If the application delay is not defined or provided to the UE, the UE can start applying the adaptation from the next SPS PDSCH reception or the next CG PUSCH transmission.

The method 1300, as illustrated in FIG. 13, describes an example UE procedure for adaptation of parameters for SPS PDSCH receptions or CG-PUSCH transmissions based on a DCI format provided by a PDCCH reception outside a DRX active time according to the disclosure.

In step 1310, a UE (such as the UE 116) receives a number of SPS PDSCH or CG PUSCH configurations and is configured with DRX operation in RRC_CONNECTED state. In step 1320, the UE receives a PDCCH that provides a DCI format prior to a DRX ON duration. Herein the DCI format provides a wake-up indicator that indicates whether or not the UE should receive SPS PDSCHs or transmit CG PUSCHs during the active time of a next DRX cycle. In step 1330, the UE decodes the DCI format. In step 1340, the UE determines a value for the wake-up indicator. When the value indicates to the UE to receive SPS PDSCHs or transmit CG PUSCHs, for example when the value of the indicator is "1" (as determined in step 1340), the UE, in step 1350, receives SPS PDSCHs or transmits CG PUSCHs during the next DRX ON duration based on the configurations and any adaptation information provided by the DCI format. Alternatively, when the value of the indicator is not "1" (as determined in step 1340), the UE in step 1360 does not expect to receive SPS PDSCHs or transmit CG PUSCHs during next DRX ON duration.

The method 1400, as illustrated in FIG. 14, describes another example UE procedure for adaptation of parameters for SPS PDSCH receptions or CG-PUSCH transmissions based on a DCI format provided by a PDCCH reception according to the disclosure.

In step 1410, a UE (such as the UE 116) is provided a configuration for SPS PDSCH receptions or CG PUSCH transmissions. In step 1420, the UE receives a configuration for a search space set. In step 1430, the UE receives a PDCCH providing a DCI format that activates the SPS PDSCH receptions or CG PUSCH transmissions. In step 1440, the UE receives the SPS PDSCH or transmits the CG PUSCHs, and monitors PDCCHs for a second DCI format in the search space set (or in a second search space set). In step 1450, the UE receives a PDCCH that includes the second DCI format providing adaptation information for the SPS PDSCH receptions or CG PUSCH transmissions. In step 1460, the UE applies the adaptation for the SPS PDSCH receptions or CG PUSCH transmissions after an application delay.

Although FIG. 12 illustrates the diagram 1200, FIG. 13 illustrates the method 1300, and FIG. 14 illustrates the method 1400 various changes may be made to FIGS. 12-14. For example, while the methods 1300 and 1400 are shown as a series of steps, various steps could overlap, occur in parallel, occur in a different order, or occur multiple times. In another example, steps may be omitted or replaced by other steps. For example, steps of the method 1300 and the steps of the method 1400 can be executed in a different order.

The following embodiments of the present disclosure describe skipping of SPS PDSCH receptions or CG PUSH transmission. This is described in the following examples and embodiments, such as those of FIG. 15.

Figure 15:
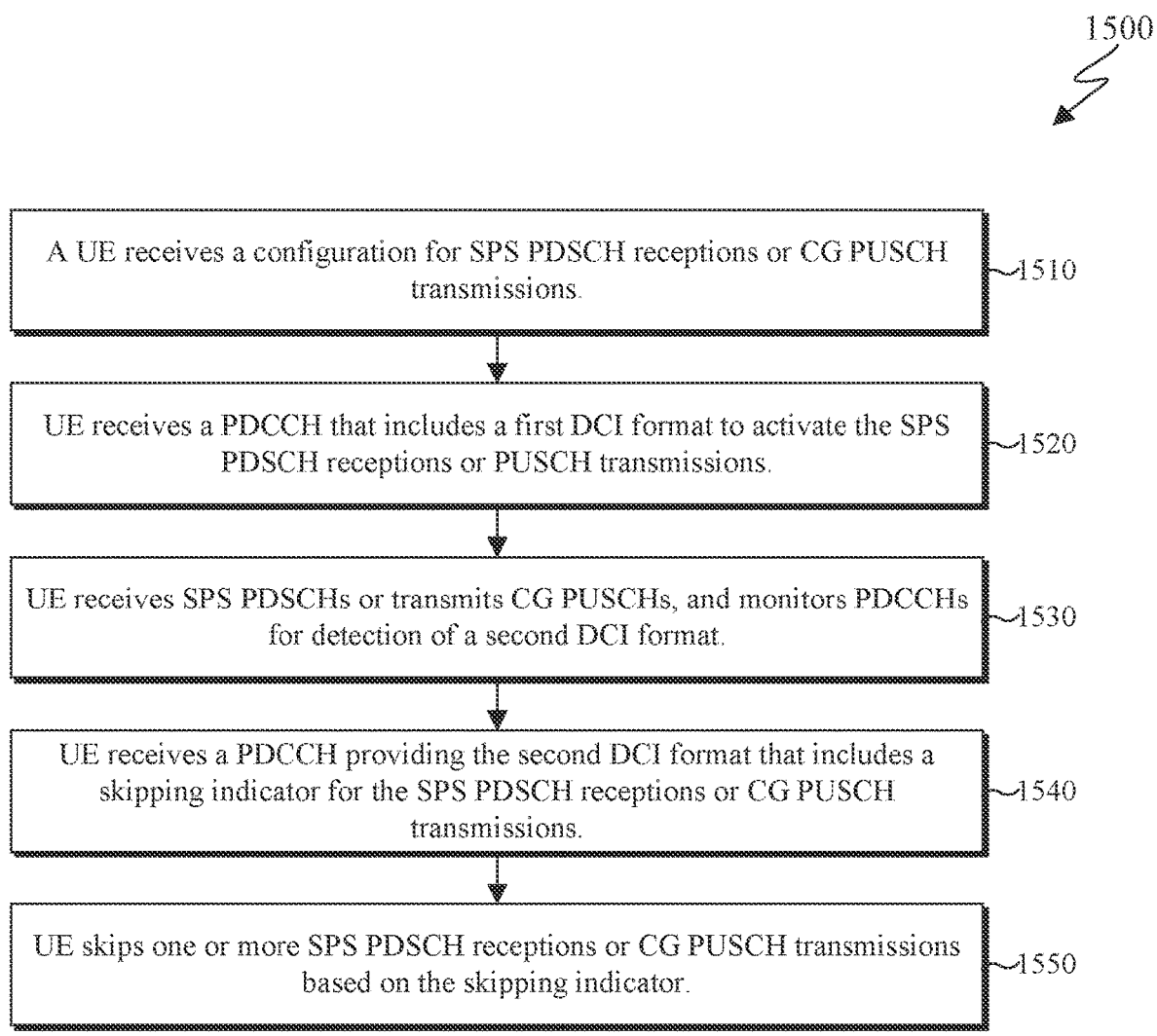
FIG. 15 illustrates an example method for determining whether or not to skip SPS PDSCH receptions or CG PUSCH transmissions according to embodiments of the present disclosure.

FIG. 15 illustrates an example method 1500 for determining whether or not to skip SPS PDSCH receptions or CG PUSCH transmissions according to embodiments of the present disclosure. The steps of the method 1500 of FIG. 15 can be performed by any of the UEs 111-116 of FIG. 1, such as the UE 116 of FIG. 3. The method 1500 is for illustration only and other embodiments can be used without departing from the scope of the present disclosure.

Certain embodiments of the present disclosure consider signaling mechanisms for indicating to a UE (such as the UE 116) to skip SPS PDSCH reception occasions or CG PUSCH transmission occasions.

In addition to activation or release of a SPS PDSCH configuration based on a DCI format in a PDCCH reception, a UE (such as the UE 116) can receive a PDCCH providing a DCI format that indicates to the UE to skip a number of SPS PDSCH reception occasion(s), or a time duration for SPS PDSCH receptions for an activated SPS PDSCH configuration. The UE resumes SPS PDSCH receptions in configured reception occasions after an expiration of the indicated time duration, or after a number of skipped SPS PDSCH reception occasion(s).

In certain embodiments, a UE (such as the UE 116) does not need to report HARQ-ACK information associated with skipped SPS PDSCH receptions, as indicated by a DCI format, at least when the UE is configured to report HARQ-ACK information according to a Type-2 HARQ-ACK codebook. For a PUCCH or PUSCH transmission that is associated with reporting HARQ-ACK information for one or more SPS PDSCH receptions, the UE can skip the PUCCH or PUSCH transmission when the UE skips all of the one or more SPS PDSCH receptions; otherwise, the UE transmits the PUCCH or PUSCH that includes a HARQ-ACK codebook wherein the HARQ-ACK codebook includes HARQ-ACK information for all SPS PDSCH receptions, for example based on a Type-1 HARQ-ACK codebook, or only for non-skipped SPS PDSCH receptions, for example based on a Type-2 HARQ-ACK codebook.

In addition to activation or release of Type 2 CG PUSCH configuration based on a DCI format in a PDCCH reception, a UE (such as the UE 116) can receive a PDCCH providing a DCI format that indicates to the UE to skip a number of CG PUSCH transmission occasion(s), or a time duration for CG PUSCH transmissions for an activated CG PUSCH configuration. The UE resumes CG PUSCH transmissions in configured transmission occasions after an expiration of the indicated time duration, or after a number of skipped CG PUSCH transmission occasion(s).

For example, a serving gNB can indicate to a UE (such as the UE 116) to skip SPS PDSCH receptions when the data buffer for the UE at the gNB is empty. For example, a serving gNB can indicate to a UE (such as the UE 116) to skip CG-PUSCH transmissions based on a buffer status report (BSR) from the UE. Such indications enable the gNB to temporarily suspend SPS PDSCH receptions by the UE or CG-PUSCH transmissions from the UE without deactivating and re-activating a corresponding configuration and can enable a serving gNB to improve resource utilization or to provide power savings for the UE operation.

The L1 signal/channel to trigger skipping of SPS PDSCH receptions or CG PUSCH transmissions can be a PDCCH that includes a DCI format providing a skipping indicator. For example, the skipping indicator can be a time duration for skipping SPS PDSCH receptions for one or more activated SPS PDSCH configurations. For another example, the skipping indicator can be a time duration for skipping CG PUSCH transmissions for one or more activated CG PUSCH configurations. For another example, the skipping indicator can be a number of next SPS PDSCH reception occasions or periods to skip for one or more activated SPS PDSCH configurations. For another example, the skipping indicator can be a number of next CG PUSCH transmission occasions or periods to skip for one or more activated CG PUSCH configurations. For another example, the skipping indicator can be a bitmap, where each bit of the bitmap is associated with one or more SPS PDSCH reception occasion(s) for one or a group of SPS PDSCH configuration(s). A bit indicates whether or not to skip SPS PDSCH reception(s) in associated SPS PDSCH reception occasion(s). For example, the bitmap can be associated with a number of configured SPS PDSCH reception occasion(s) for a next SPS PDSCH reception period. For yet another example, the skipping indicator can be a bitmap, where each bit of the bitmap is associated with one or more CG PUSCH transmission occasion(s) for one or a group of CG PUSCH configuration(s). A bit indicates whether or not to skip CG PUSCH transmission(s) in associated CG PUSCH transmission occasion(s). For example, the bitmap can be associated with a number of configured CG PUSCH transmission occasion(s) for a next CG PUSCH transmission period.

For determining one or more activated SPS PDSCH or CG PUSCH configuration(s) to apply a received skipping indicator, the following approaches can be used. In a first approach, the indices of the one or more activated SPS PDSCH configurations or CG PUSCH configurations to apply the skipping indicator can be included in the DCI format.

In a second approach, the one or more activated SPS PDSCH configurations or CG PUSCH configurations to apply the skipping indicator can be predetermined based on the configurations. In a configuration of a SPS PDSCH or CG PUSCH, the configuration can include a parameter for whether or not the SPS PDSCH or CG PUSCH is applicable for skipping SPS PDSCH receptions or CG PUSCH transmissions. For example, a SPS PDSCH or CG PUSCH configuration can include a parameter to indicate a list of candidate values for a skipping indicator. A UE (such as the UE 116) assumes that respective skipping is applicable for the SPS PDSCH or CG PUSCH configuration when the parameter is present; otherwise, the UE does not skip SPS PDSCH receptions or CG PUSCH transmissions for the configuration.

In certain embodiments, a DCI format that includes a skipping indicator can be determined based on one of the following methods. In a first method, the DCI format can be DCI format with CRC scrambled by CS-RNTI. For example, the DCI format can be same as the DCI format used to indicate release of a SPS PDSCH or CG PUSCH configuration. Table (1) below illustrates the special fields in the DCI format 1_0/1_1/1_2 when the DCI format 1_0/1_1/1_2 indicates a release of a SPS PDSCH configuration, and the special fields in the DCI format 0_0/0_1/0_2 when the DCI format 0_0/0_1/0_2 indicates a release of a CG PUSCH configuration. Table (2), below, illustrates the special fields in the DCI format 1_0/1_1/1_2 when the DCI format 1_0/1_1/1_2 indicates skipping of SPS PDSCH receptions for a SPS PDSCH configuration, and the special fields in the DCI format 0_0/0_1/0_2 when the DCI format 0_0/0_1/0_2 indicates skipping of CG PUSCH transmissions for a CG PUSCH configuration. The fields of Redundancy version, Modulation and coding scheme, and Frequency domain resource assignment are same in Table (1) and Table (2). The UE further determines whether the DCI format indicates a release of a SPS/CG configuration or to skip PDSCH/PUSCH receptions/transmissions, respectively, based on a predetermined field of the DCI format. When the predetermined field of the DCI format is set to all "0s", the DCI format indicates a release of a SPS/CG configuration; otherwise, the predetermined field provides a value for a skipping indicator. One example of the predetermined field is a time domain resource allocation (TDRA) field.

In a second method, the DCI format can be provided by a PDCCH that is received according to a common search space set. A UE (such as the UE 116) can be provided by higher layers a starting position for a block of bits in the DCI format, and for a number of bits in the block of bits if that number is not predetermined in the specifications of the system operation, wherein the block of bits includes at least a skipping indicator.

TABLE 1

|  | DCI format 0_0/0_1/0_2 | DCI format 1_0/1_1/1_2 |
| --- | --- | --- |
| Redundancy version | set to all '0's | set to all '0's |
| Modulation and coding scheme | set to all '1's | set to all '1's |
| Frequency domain resource assignment | set to all '0's for frequency domain resource allocation (FDRA) Type 2 with μ = 1 set to all '1's, otherwise | set to all '0's for FDRA Type 0 or for dynamicSwitch set to all '1's for FDRA Type 1 |
| Time domain resource assignment | Set to all '0' | Set to all '0' |

TABLE 2

|  | DCI format 0_0/0_1/0_2 | DCI format 1_0/1_1/1_2 |
| --- | --- | --- |
| Redundancy version | set to all '0's | set to all '0's |
| Modulation and coding scheme | set to all '1's | set to all '1's |
| Frequency domain resource assignment | set to all '0's for FDRA Type 2 with μ = 1 set to all '1's, otherwise | set to all '0's for FDRA Type 0 or for dynamicSwitch set to all '1's for FDRA Type 1 |
| Time domain resource assignment | Not all '0' | Not all "0" |

In certain embodiments, the reception occasions of PDCCH candidates providing the DCI format with a SPS PDSCH/CG PUSCH skipping indicator can be based on the configuration of corresponding search space set(s). The search space set(s) can be associated with a SPS PDSCH configuration or a CG PUSCH configuration for applying the skipping indicator. In one example, the UE also monitors PDCCH for detection of a DCI format for activation of the SPS PDSCH configuration or CG PUSCH configuration in the search space set(s). If the SPS PDSCH configuration or CG PUSCH configuration is activated by a DCI format provided by a PDCCH reception according to one of the search space set(s), the UE starts monitoring PDCCH in the search space set(s) for detection of the DCI format that triggers skipping of SPS PDSCH receptions for the SPS configuration or skipping of CG PUSCH transmissions for the CG PUSCH configuration; otherwise, when the SPS PDSCH configuration or CG PUSCH configuration is released or skipped, the UE does not expect to monitor PDCCH according to the search space set(s) for detection of the DCI format that triggers skipping of SPS PDSCH receptions or CG PUSCH transmissions.

In certain embodiments when a UE (such as the UE 116) receives a DCI format in a PDCCH that provides a skipping indication for SPS PDSCH receptions or CG PUSCH transmissions, the UE applies the skipping indication after an application delay, $T_{delay}$. The UE starts applying the skipping indication from a first slot that starts at or after $T_{delay}$ from the end of the PDCCH reception that provides the DCI format. The value of application delay can be determined based on one of the following methods. In a first method, $T_{delay}$ is defined in the specifications of the system operation. For example, $T_{delay}=1$ ms or 1 slot.

In a second method, $T_{delay}$ is configured by higher layers.

In a third method, $T_{delay}$ is determined based on UE capability. The UE reports its capability for $T_{delay}$ to a serving cell.

In a fourth method, $T_{delay}=0$ when the DCI format is the same DCI format that activates the SPS PDSCH receptions or CG PUSCH transmissions.

In a fifth method, $T_{delay}$ is included in the DCI format.

If the application delay is not defined or provided to the UE, the UE can start applying the skipping indicator at a next SPS PDSCH reception or a next CG PUSCH transmission after the reception of the PDCCH that provides the DCI format.

The method 1500, as illustrated in FIG. 15 describes an example UE procedure for determining whether or not to skip SPS PDSCH receptions or CG PUSCH transmissions according to the disclosure.

In step 1510, a UE (such as the UE 116) receives a configuration for SPS PDSCH receptions or CG PUSCH transmissions. In step 1520, the UE receives a PDCCH that provides a first DCI format activating the SPS PDSCH receptions or CG PUSCH transmissions. In step 1530, the UE receives PDSCHs in configured reception occasions for the activated SPS PDSCH configuration or transmits PUSCHs in the configured transmission occasions for the activated CG PUSCH configuration. In step 1540, the UE receives another PDCCH providing a second DCI format that includes a skipping indicator for the activated SPS PDSCH or CG PUSCH configuration. In step 1550, the UE skips one or more PDSCHs receptions for the activated SPS PDSCH configuration or one or more PUSCHs transmissions for the activated CG PUSCH configuration, where the reception occasion(s) for the skipped one or more PDSCHs or the transmission occasion(s) for the skipped one or more PUSCHs are determined based on the skipping indicator.

Although FIG. 15 illustrates the method 1500 various changes may be made to FIG. 15. For example, while the method 1500 is shown as a series of steps, various steps could overlap, occur in parallel, occur in a different order, or occur multiple times. In another example, steps may be omitted or replaced by other steps. For example, steps of the method 1500 can be executed in a different order.

The following embodiments of the present disclosure describe wake-up indication for SPS PDSCH receptions or CG PUSCH transmissions. This is described in the following examples and embodiments, such as those of FIG. 16.

Figure 16:
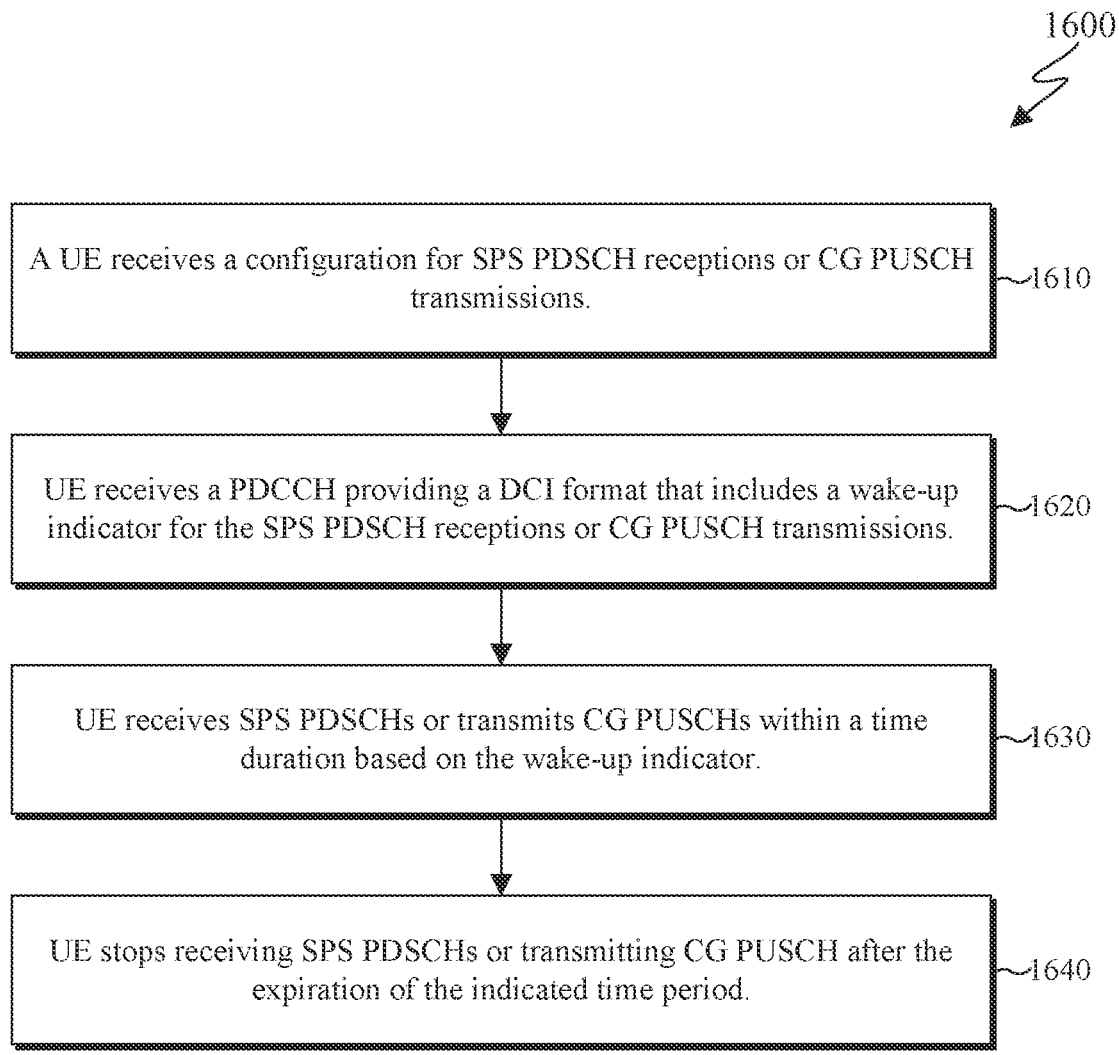
FIG. 16 illustrates an example method for the UE to receive SPS PDSCH receptions or CG PUSCH transmissions for corresponding activated configurations based on a wake-up indicator according to embodiments of the present disclosure.

FIG. 16 illustrates an example method 1600 for the UE to receive SPS PDSCH or transmit CG PUSCH for corresponding activated configurations based on a wake-up indicator according to embodiments of the present disclosure. The steps of the method 1600 of FIG. 16 can be performed by any of the UEs 111-116 of FIG. 1, such as the UE 116 of FIG. 3. The method 1600 is for illustration only and other embodiments can be used without departing from the scope of the present disclosure.

Certain embodiments of the present disclosure consider signaling mechanisms for indicating to a UE (such as the UE 116) to receive SPS PDSCHs or transmit CG PUSCHs for a configuration of SPS PDSCH receptions or a configuration of CG PUSCH transmissions that is released or is not activated.

For a SPS PDSCH configuration that is released or is not activated, a UE (such as the UE 116) can receive a PDCCH providing a DCI format that indicates to the UE to receive PDSCH in a number of SPS PDSCH reception occasion(s)/period(s), or a time duration for SPS PDSCH receptions for the SPS PDSCH configuration. The UE does not receive PDSCH for other SPS PDSCH receptions occasions or stops receiving PDSCH for SPS PDSCH reception occasions after an expiration of the indicated time duration. The UE reports HARQ-ACK information only for received SPS PDSCHs.

For a CG PUSCH configuration that is released or is not activated, a UE (such as the UE 116) can receive a PDCCH providing a DCI format that indicates to the UE to transmit a number of CG PUSCHs, or a time duration for CG PUSCH transmissions, for the CG PUSCH configuration. The UE does not transmit other CG PUSCHs or stops transmitting CG PUSCHs after an expiration of the indicated time duration.

The L1 signal/channel to trigger receptions of SPS PDSCHs or transmissions of CG PUSCHs can be a PDCCH that includes a DCI format. A serving gNB can enable SPS PDSCH receptions or CG PUSCH transmissions by a DCI format without having to provide full scheduling information in the DCI format, thereby reducing a corresponding control overhead. The DCI format provides an indicator to indicate at least one of the following. For example, the indicator can indicate a time duration for SPS PDSCH reception for one or more SPS PDSCH configurations that is released or is not activated. For another example, the indicator can indicate a time duration for CG PUSCH transmission for one or more CG PUSCH configurations that is released or is not activated. For another example, the indicator can indicate a number of next SPS PDSCH reception occasions to receive PDSCH for one or more SPS PDSCH configurations that are released or are not activated. For another example, the indicator can indicate a number of next CG PUSCH transmission occasions to transmit PUSCH for one or more CG PUSCH configurations that are released or are not activated. For another example, the indicator can indicate a bitmap, wherein each bit of the bitmap is associated with one or more SPS PDSCH reception occasion(s) for one or a group of SPS PDSCH configuration(s). A bit of the bitmap indicates whether or not to receive SPS PDSCH in associated SPS PDSCH reception occasion(s). For example, the bitmap can be associated with a number of configured SPS PDSCH reception occasion(s) for a next SPS PDSCH reception period. For yet another example, the indicator can indicate a bitmap, wherein each bit of the bitmap is associated with one or more CG PUSCH transmission occasion(s) for one or a group of CG PUSCH configuration(s). A bit of the bitmap indicates whether or not to transmit CG PUSCH in associated CG PUSCH transmission occasion(s). For example, the bitmap can be associated with a number of configured CG PUSCH transmission occasion(s) for the next CG PUSCH transmission period.

In certain embodiments the indicator is referred as wake-up indicator in this disclosure.

For determining one or more SPS PDSCH or CG PUSCH configuration(s) that are released or are not activated to apply a wake-up indicator, one of the following methods can be used. In a first method, the indices of the one or more SPS PDSCH or CG PUSCH configurations to apply the wake-up indicator can be included in the DCI format.

In a second method, the one or more SPS PDSCH or CG PUSCH configurations to apply the wake-up indicator can be predetermined based on the configurations. In a configuration of a SPS PDSCH or CG PUSCH, the configuration can include a parameter for whether or not the SPS PDSCH or CG PUSCH is applicable for skipping PDSCH receptions or PUSCH transmissions based on a wake-up indicator in a DCI format. For example, a SPS PDSCH or CG PUSCH configuration can include a parameter to indicate a list of candidate values for a wake-up indicator. A UE (such as the UE 116) assumes the SPS PDSCH or CG PUSCH configuration is applicable for a wake-up indicator for SPS PDSCH receptions or CG PUSCH transmissions when the parameter is present; otherwise, the UE does not apply the wake-up indicator to the SPS PDSCH configuration or CG PUSCH configuration.

In certain embodiments, a DCI format that includes a wake-up indicator can be determined based on one of the following methods. In a first method, the DCI format can be a DCI format with CRC scrambled by CS-RNTI. For example, the DCI format can be same as the DCI format used to indicate activation of a SPS PDSCH or CG PUSCH configuration.

In a second method, the DCI format can be provided by a PDCCH that is received according to a common search space set. A UE (such as the UE 116) can be provided by higher layers a starting position for a block of bits in the DCI format, and for a number of bits in the block of bits when the number not predetermined in the specifications of the system operation, wherein the block of bits includes at least a wake-up indicator.

In certain embodiments, the reception occasions of PDCCH candidates providing the DCI format with a wake-up indicator can be based on the configuration of corresponding search space set(s). The search space set(s) can be associated with a SPS configuration or a CG PUSCH configuration for applying the wake-up indicator. In one example, the UE also monitors a DCI format for release of the SPS PDSCH configuration or CG PUSCH configuration in the search space set(s). If the SPS PDSCH configuration or CG PUSCH configuration is released by a DCI format provided in a PDCCH reception according to one of the search space set(s), the UE starts monitoring PDCCH according to the search space set(s) for detection of the DCI format with the wake-up indicator for the SPS configuration or the CG PUSCH configuration; otherwise, if the SPS configuration or CG PUSCH configuration is activated, the UE does not expect to monitor PDCCH according to the search space set(s) for detection of the DCI format with the wake-up indicator.

The UE (such as the UE 116) applies the wake-up indicator after an application delay, $T_{delay}$, and determines the first slot for the first SPS PDSCH reception or CG PUSCH transmission to be the first/earliest slot that is $T_{delay}$ after the last symbol of the PDCCH that provides the DCI format with the wake-up indicator. The value of application delay can be determined based on one of the following methods. In a first method, $T_{delay}$ is defined in the specifications of the system operation. For example, $T_{delay}$=1 ms or 1 slot.

In a second method, $T_{delay}$ is configured by higher layers.

In a third method, $T_{delay}$ is determined based on UE capability. The UE reports its capability for $T_{delay}$ to a serving cell.

In a fourth method, $T_{delay}$ is included in the DCI format.

The method 1600, as illustrated in FIG. 16 describes an example UE procedure for the UE to receive SPS PDSCH receptions or CG PUSCH transmissions for corresponding activated configurations based on a wake-up indicator according to the disclosure.

In step 1610, a UE (such as the UE 116) receives a configuration for SPS DSCH receptions or CG PUSCH transmissions. In step 1620, the UE receives a PDCCH providing a DCI format that includes a wake-up indicator for the SPS PDSCH or CG PUSCH configuration. In step 1630, the UE receives SPS PDSCHs or transmits CG PUSCHs within a time duration, wherein the time duration is indicated by the wake-up indicator. In step 1640, the UE stops receiving SPS PDSCHs or transmitting CG PUSCH after the expiration of the indicated time period.

Although FIG. 16 illustrates the method 1600 various changes may be made to FIG. 16. For example, while the method 1600 is shown as a series of steps, various steps could overlap, occur in parallel, occur in a different order, or occur multiple times. In another example, steps may be omitted or replaced by other steps. For example, steps of the method 1600 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for receiving semi-persistently scheduled (SPS) physical downlink shared channels (PDSCHs) or for transmitting configured grant (CG) physical uplink shared channels (PUSCHs), the method comprising:
receiving a physical downlink control channel (PDCCH) that provides a downlink control information (DCI) format;
determining:
based on values of first fields in the DCI format, activation of SPS PDSCH receptions or of CG PUSCH transmissions, and
based on values of second fields in the DCI format, a time duration for the SPS PDSCH receptions or for the CG PUSCH transmissions; and
receiving the SPS PDSCHs or transmitting the CG PUSCHs within the time duration,
wherein the time duration starts from a first slot, for the SPS PDSCH receptions or the CG PUSCH transmissions, that is after a slot of the PDCCH reception.

2. The method of claim 1, wherein the time duration is a number of slots for the SPS PDSCH receptions or for the CG PUSCH transmissions.

3. The method of claim 1, wherein the time duration is a number of system frames.

4. The method of claim 1, wherein the time duration is a number of occasions for the SPS PDSCH receptions or for the CG PUSCH transmissions.

5. The method of claim 1, further comprising determining a start for the time duration based on values of third fields in the DCI format.

6. The method of claim 1, wherein:
the activation is for (i) the SPS PDSCH receptions associated with multiple SPS PDSCH configurations or (ii) the CG PUSCH transmissions associated with multiple CG PUSCH configurations, and
determining the time duration comprises separately determining the time duration for each of the multiple SPS PDSCH configurations or the multiple CG PUSCH configurations.

7. A user equipment (UE) comprising:
a transceiver configured to:
receive a physical downlink control channel (PDCCH) that provides a downlink control information (DCI) format; and
a processor operably coupled to the transceiver, the processor configured to determine:
based on values of first fields in the DCI format, activation of receptions of semi-persistently scheduled (SPS) physical downlink shared channels (PD- SCHs) or transmissions of configured grant (CG) physical uplink shared channels (PUSCHs), and based on values of second fields in the DCI format, a time duration for the SPS PDSCH receptions or for the CG PUSCHs transmissions, wherein the transceiver is further configured to receive the SPS PDSCHs or transmit the CG PUSCHs within the time duration, and wherein the time duration starts from a first slot, for the SPS PDSCH receptions or the CG PUSCH transmissions, that is after a slot of the PDCCH reception.

8. The UE of claim 7, wherein the time duration is a number of slots for the SPS PDSCH receptions or for the CG PUSCH transmissions.

9. The UE of claim 7, wherein the time duration is a number of system frames.

10. The UE of claim 7, wherein the time duration is a number of occasions for the SPS PDSCH receptions or for the CG PUSCH transmissions.

11. The UE of claim 7, wherein the processor is further configured to determine a start for the time duration based on values of third fields in the DCI format.

12. The UE of claim 7, wherein:

the activation is for (i) the SPS PDSCH receptions associated with multiple SPS PDSCH configurations or (ii) the CG PUSCH transmissions associated with multiple CG PUSCH configurations, and the processor is further configured to determine the time duration separately for each of the multiple SPS PDSCH configurations or the multiple CG PUSCH configurations.

13. A base station comprising:

a processor configured to determine:

based on values of first fields in a downlink control information (DCI) format, activation of receptions of semi-persistently scheduled (SPS) physical downlink shared channel (PDSCH) or transmissions of configured grant (CG) physical uplink shared channel (PUSCH) transmissions, and based on values of second fields in the DCI format, a time duration for the SPS PDSCH receptions or for the CG PUSCHs transmissions; and a transceiver operably coupled to the processor, the transceiver configured to:

transmit a physical downlink control channel (PDCCH) that provides the DCI format; and transmit the SPS PDSCHs or receive the CG PUSCHs within the time duration, wherein the time duration starts from a first slot, for the SPS PDSCH receptions or the CG PUSCH transmissions, that is after a slot of the PDCCH reception.

14. The base station of claim 13, wherein the time duration is a number of slots for the SPS PDSCH receptions or the CG PUSCH transmissions.

15. The base station of claim 13, wherein the time duration is a number of system frames.

16. The base station of claim 13, wherein the time duration is a number of occasions for the SPS PDSCH receptions or for the CG PUSCH transmissions.

17. The base station of claim 13, wherein the processor is further configured to determine a start for the time duration based on values of third fields in the DCI format.

* * * * *